US011539953B2

(12) United States Patent
Gao et al.

(10) Patent No.: US 11,539,953 B2
(45) Date of Patent: Dec. 27, 2022

(54) APPARATUS AND METHOD FOR BOUNDARY PARTITION

(71) Applicant: Huawei Technologies Co., Ltd., Shenzhen (CN)

(72) Inventors: Han Gao, Munich (CN); Semih Esenlik, Munich (DE); Zhijie Zhao, Munich (DE); Anand Meher Kotra, Munich (DE); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/188,940

(22) Filed: Mar. 1, 2021

(65) Prior Publication Data

US 2021/0185317 A1 Jun. 17, 2021

Related U.S. Application Data

(63) Continuation of application No. PCT/CN2019/103178, filed on Aug. 29, 2019.
(Continued)

(51) Int. Cl.
*H04N 19/122* (2014.01)
*H04N 19/119* (2014.01)
(Continued)

(52) U.S. Cl.
CPC ......... *H04N 19/122* (2014.11); *H04N 19/119* (2014.11); *H04N 19/176* (2014.11); *H04N 19/44* (2014.11); *H04N 19/60* (2014.11)

(58) Field of Classification Search
CPC .. H04N 19/122; H04N 19/119; H04N 19/176; H04N 19/44; H04N 19/60; H04N 19/167; H04N 19/46
See application file for complete search history.

(56) References Cited

U.S. PATENT DOCUMENTS

2014/0348250 A1 11/2014 Cho et al.
2020/0007865 A1* 1/2020 Xu ........................ H04N 19/132
(Continued)

FOREIGN PATENT DOCUMENTS

CN 107431815 A 12/2017
CN 108028925 A 5/2018
(Continued)

OTHER PUBLICATIONS

Zhang et al., "CE1-related: Zero-Unit for Picture Boundary Handling," Joint Video Experts Team (JVET) of ITU-T SG 16 WP 3 and ISO/IEC JTC 1/SC29/WG11, 11th Meeting: Ljubljana, SI, Document: JVET-K0320-v4, Total 5 pages, XP030199866 (Jul. 10-18, 2018).
(Continued)

*Primary Examiner* — Tat C Chio
(74) *Attorney, Agent, or Firm* — Leydig, Voit & Mayer, Ltd.

(57) ABSTRACT

A method for boundary partition of a current block is provided. The method includes obtaining a partition indicator from a received bitstream; determining whether the partition indicator indicates that the current block is to be split and whether the current block is a boundary block; and performing a non-inverse transform operation on an inside part of the current block when the partition indicator indicates that the current block is not to be split and the current block is a boundary block, wherein the inside part of the block is located within the picture. For the boundary block which is determined not to be split, a non-inverse transform operation is chosen. This avoids a normal inverse transform on the residuals of the inside part (within the picture) of the current block in the decoder, so number of blocks for the inverse transformation is decreased, and decoding complexity is thus reduced.

19 Claims, 15 Drawing Sheets

Related U.S. Application Data

(60) Provisional application No. 62/724,586, filed on Aug. 29, 2018.

(51) Int. Cl.
  *H04N 19/176* (2014.01)
  *H04N 19/44* (2014.01)
  *H04N 19/60* (2014.01)

(56) References Cited

U.S. PATENT DOCUMENTS

| | | | | |
|---|---|---|---|---|
| 2020/0077094 | A1* | 3/2020 | Poirier | H04N 19/167 |
| 2022/0030224 | A1* | 1/2022 | Lee | H04N 19/119 |

FOREIGN PATENT DOCUMENTS

| | | |
|---|---|---|
| WO | 2016090568 A1 | 6/2016 |
| WO | 2016091161 A1 | 6/2016 |
| WO | 2017123980 A1 | 7/2017 |
| WO | 2020003268 A2 | 1/2020 |
| WO | 2020009864 A1 | 1/2020 |

OTHER PUBLICATIONS

Zhang et al., "CE1-related: Zero-Unit for Picture Boundary Handling," The Joint Video Exploration Team of ISO/IEC JTC1/SC29/WG11 and ITU-T SG.16, 11th JVET Meeting, Ljubljana, No. JVET-K0320, Total 8 pages, XP030199863 (Jul. 2018).

Bross et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Document: JVET-K1001-v1, Total 41 pages, XP030193508 (Jul. 10-18, 2018).

Kim et al., "Block Partitioning Structure in the HEVC Standard," IEEE Transactions on Circuits and Systems for Video Technology, vol. 22, No. 12, pp. 1697-1706, Institute of Electrical and Electronics Engineers, New York, New York (Dec. 2012).

"Series H: Audiovisual and Multimedia Systems, Infrastructure of audiovisual services—Coding of moving video, Video coding for low bit rate communication," ITU-T H.263, total 226 pages, Geneva, Switzerland (Jan. 2005).

Li et al., "Multi-Type-Tree," Joint Video Exploration Team (JVET) of ITU-T SG 16 WP 3 and ISO/IEC JTC 1/SC 29/WG 11, 4th Meeting: Chengdu, CN, JVET-D0117r1, total 3 pages (Oct. 15-21, 2016).

"Series H: Audiovisual and Multimedia Systems, Infrastructure of audiovisual services—Coding of moving video, Advanced video coding for generic audiovisual services," ITU-T H.264, total 790 pages, Geneva, Switzerland (Feb. 2014).

Ma et al., "Description of Core Experiment: Partitioning," Joint Video Exploration Team (JVET) of ITU-T SG 16 WP 3 and ISO/IEC JTC 1/SC 29/WG 11, 10th Meeting: San Diego, US, JVET-J1021-r5, total 32 pages (Apr. 10-20, 2018).

Gao et al., "CE1-2.0.11: Picture Boundary Handling," Joint Video Experts Team (JVET) of ITU-T SG 16 WP 3 and ISO/IEC JTC 1/SC 29/WG 11, 11th Meeting: Ljubljana, SI, JVET-K0287-v1, total 7 pages (Jul. 10-18, 2018).

Xu et al., "CE1 related: Partial CU for picture boundary handling," Joint Video Experts Team (JVET) of ITU-T SG 16 WP 3 and ISO/IEC JTC 1/SC 29/WG 11, 11th Meeting: Ljubljana, SI, JVET-K0366-v2, total 2 pages (Jul. 10-18, 2018).

Wieckowski et al., "CE1-related: Joint proposal for picture boundary partitioning by Fraunhofer HHI and Huawei," Joint Video Experts Team (JVET) of ITU-T SG 16 WP 3 and ISO/IEC JTC 1/SC 29/WG 11, 11th Meeting: Ljubljana, SI, JVET-K0554-v1, total 2 pages (Jul. 10-18, 2018).

Misra et al., "Report of BoG on Picture Boundary Partitioning," Joint Video Experts Team (JVET) of ITU-T SG 16 WP 3 and ISO/IEC JTC 1/SC 29/WG 11, 11th Meeting: Ljubljana, SI, JVET-K0559-V2, total 5 pages (Jul. 10-18, 2018).

Bross et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, JVET-K1001-V4, total 86 pages (Jul. 10-18, 2018).

Chen et al., "Algorithm description for Versatile Video Coding and Test Model 2 (VTM 2)," Joint Video Experts Team (JVET) of ITU-T SG 16 WP 3 and ISO/IEC JTC 1/SC 29/WG 11, 11th Meeting: Ljubljana, SI, JVET-K1002-v1, total 19 pages (Jul. 10-18, 2018).

Bross et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, JVET-K1001-V2, total 53 pages (Jul. 10-18, 2018).

"Series H: Audiovisual and Multimedia Systems Infrastructure of audiovisual services—Coding of moving Video, High efficiency video coding," ITU-T H.265, total 692 pages, Geneva Switzerland (Feb. 2018).

\* cited by examiner

APPARATUS AND METHOD FOR BOUNDARY PARTITION

CROSS-REFERENCE TO RELATED APPLICATIONS

This application is a continuation of International Application No. PCT/CN2019/103178, filed on Aug. 29, 2019, which claims the benefit of U.S. Provisional Application No. 62/724,586, filed on Aug. 29, 2018. The disclosures of the aforementioned applications are hereby incorporated by reference in their entireties.

TECHNICAL FIELD

The present disclosure relates to the technical field of image and/or video coding and decoding, and in particular to apparatus and method for boundary partition.

BACKGROUND

Digital video has been widely used since the introduction of DVD-discs. Before transmission, the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

As video involves a sequence of images, results may be achieved also by treating individual images better. Thus, some methods and technologies can be used both in video and individual or still image processing.

As there is a continuous need for improving quality and reducing bandwidth requirements, solutions that maintain the quality with reduced bandwidth requirements or improve the quality while maintaining the bandwidth requirement are continuously searched. Furthermore, sometimes compromises may be acceptable. For example, it may be acceptable to increase the bandwidth requirements if the quality improvement is significant.

The High Efficiency Video Coding (HEVC) is an example of a video coding standard that is commonly known to persons skilled in the art. In HEVC, a coding unit (CU) may be split into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, it removes the concepts of multiple partition types, i.e. it removes the separation of the CU, PU and TU concepts except as needed for CUs that have a size too large for the maximum transform length, and supports more flexibility for CU partition shapes.

As the video creation and use have become more and more ubiquitous, video traffic is the biggest load on communication networks and driver for increasing data storage demands. Accordingly, one of the goals of most of the video coding standards is to lower coding complexity compared to its predecessor without sacrificing picture quality.

SUMMARY

Apparatus and method for boundary partition (or partitioning) are disclosed. The apparatus and method use a particular boundary partition processing for decreasing the coding complexity. Boundary partition processing is also referred to as a picture or image boundary handling.

According to a first aspect of the invention, a method for boundary partition of a current block of a picture is provided. The method includes that a decoder obtains a partition indicator from a received bitstream; determines whether the partition indicator indicates that the current block is to be split and whether the current block is a boundary block and omits performing an inverse transform operation on a part of the current block when the partition indicator indicates that the current block is not to be split and the current block is a boundary block, wherein the part of the block is, for example, the part of the block located within the picture (i.e. the inside part of the block).

No matter whether the current block is a boundary block or a non-boundary block, the partition indicator of a same partition syntax is used, which is benefit to keep the continuity of context-adaptive binary arithmetic coding (CABAC) engine, or in other words, to avoid switching between different partition syntax for boundary and non-boundary blocks. Moreover, for the boundary block which is determined not to be split, a non-inverse transform operation may be chosen, this avoids a normal inverse transform on the residuals of the inside part of the current block (within the picture) in the decoder, so the number of blocks for the inverse transformation is decreased, and complexity of the decoding process is thus lowered. For example, no operation is performed on an outside part of the current block (i.e. the part of the current block which is not located inside the picture).

According to an example of the first aspect of the invention, the method includes determining whether the current block is a boundary block when the partition indicator indicates that the current block is not to be split.

According to an example of the first aspect of the invention, whether the partition indicator indicates that the current block is to be split is determined according to a block partition syntax.

No matter the current block is a boundary block or is a non-boundary block, the block partition syntax is used so that the method can keep the continuity of CABAC engine as well as fetching the picture boundary so that it will lead to lower decoding complexity.

According to another example of the first aspect of the invention, when the current block is determined as a boundary block, the decoder determines whether the inside part of the current block (within the picture) is transformable, and if the inside part of the current block is not transformable, performing of the inverse transform operation is omitted on the inside part of the current block (i.e. no inverse transform operation is performed on the inside part of the current block).

For the boundary block which is determined not to be split, a non-inverse transform operation is chosen to be performed on the inside part of the current block within the picture/video frame when decoding the boundary block, this avoids an inverse transform on the residuals of the inside part of the current block (within the picture) in the decoder, so the number of blocks for the inverse transform processing is decreased and the decoding complexity is thus lowered.

According to an example of the first aspect of the invention, when determining that the current block is transformable, the method further includes determining that the inside part of the current block within the picture is to be transformed (e.g. method includes transforming the part of the current block).

According to an example of the first aspect of the invention, determining that the current block is transformable comprises: determining that a size of the inside part of the current block (within the picture) fulfills a transform constraint of the method.

The term "size of the inside part of the current block" means a width and a height of the inside part of the current block. The transform constraint of the method may include a transform core constraint. That is, if a block is to be transformed (e.g. by using Discrete Cosine Transform (DCT), or Discrete Sine Transform (DST), etc.) using a transform core from a, e.g. predetermined, set of transform cores (e.g., 4*4, 8*8, 16*16, 32*32, 4*8, 8*4, 16*8, 8*16, 32*16, 16*32, etc.), the size of the inside part of the current block may obey a constraint regarding a transform core, for example, the width and the height of the inside part of the current block may each comprises 2 power of n (n≤1) pixels. For example, the size of the inside part of the current block (within the picture) fulfills a transform constraint of the method when the size (e.g. in samples or pixels) of the inside part of the current block matches a size of any of the, e.g. predetermined, transform cores, and does not fulfill a transform constraint of the method when the size (e.g. in samples or pixels) of the inside part of the current block does not match a size of any of the, e.g. predetermined, transform cores. The set of, e.g. predetermined, transform cores is known, e.g. to the encoder and decoder, and may be fixed or may by adapted by implicit or explicit signaling, and e.g. may comprise more or less of the aforementioned cores or even other transform cores).

The example provide an easy way for determining whether an inside part of a boundary block can be transformable.

According to an example of the first aspect of the invention, if the current block is determined not to be a boundary block and the partition indicator, e.g. in the block partition syntax, indicates that the current block is not to be split, the method includes determining that the current block is not to be split (e.g. method does not split the current block).

According to an example of the first aspect of the invention, when the partition indicator indicates that the current block is to be split, the method further comprises: splitting the current block without determining whether the current block is a boundary block or not.

In such cases, not determining whether the current block is a boundary block may further lead to lower decoding complexity.

According to an example of the first aspect of the invention, the current block is a boundary block when the current block is located only partially within a picture; and the current block is a non-boundary block when the current block is completely located within the picture.

According to an example of the first aspect of the invention, when performing the non-inverse transform operation is omitted on the inside part of the current block, the method includes one of the following operations: avoiding/bypassing (or omitting) an inverse transform on residuals of the inside part of the current block in the decoder; setting residuals of the inside part of the current block to zero; or using skip mode prediction on the inside part of the current block in the decoder.

In this way, such non-inverse transform operations are chosen for the boundary block which is determined not to be split, which avoids a normal inverse transform on the residuals of the inside part of the current block (within the picture) in the decoder, so the number of blocks for the inverse transformation is decreased, and decoding complexity is thus lowered.

According to a second aspect of the invention, a method for boundary partition of a current block of a picture is provided. The method includes that an encoder determines a partition indicator, wherein the partition indicator indicates whether the current block is to be split; determines whether the current block is a boundary block; and omits performing of a transform operation on a part of the current block (i.e., the inside part of the current block) when the partition indicator indicates the current block is not to be split and the current block is a boundary block, wherein the part of the block is located within the picture; and generates a bitstream including the partition indicator.

No matter whether the current block is a boundary block or a non-boundary block, the partition indicator of a same partition syntax is used, which is benefit to keep the continuity of context-adaptive binary arithmetic coding (CABAC) engine, or in other words, to avoid switching between different partition syntax for boundary and non-boundary blocks. Moreover, for the boundary block which is determined not to be split, a non-transform operation is chosen, this avoids a normal inverse transform on the residuals of the inside part of the current block (within the picture) in the decoder, so the number of blocks for the inverse transformation is decreased, and encoding complexity is thus lowered. For example, no operation is performed on an outside part of the current block (i.e. the part of the current block which is not located inside the picture).

According to an example of the second aspect of the invention, the encoder determines whether the current block is a boundary block when the partition indicator indicates the current block is not to be split.

According to an example of the second aspect of the invention, the partition indicator indicates that the current block is to be split is determined according to a block partition syntax.

According to an example of the second aspect of the invention, after determining that the current block is a boundary block, the method further comprises: determining whether the part of the current block is transformable; and omitting performing of the transform operation on the part of the current block within the picture when the part of the current block is not transformable.

According to an example of the second aspect of the invention, after determining that the current block is transformable, the method further comprises: determining that the part of the current block within the picture is to be transformed (e.g. the method includes transforming the part of the current block).

According to an example of the second aspect of the invention, determining that the current block is transformable comprises: determining that a size of the part of the current block within the picture fulfills a transform constraint of the method.

According to an example of the second aspect of the invention, when the current block is determined not to be a boundary block and the partition indicator in the block partition syntax indicates that the current block is not to be split, the method includes determining that current block is not to be split (e.g. the method does not split the current block).

According to an example of the second aspect of the invention, when the partition indicator indicates that the current block is to be split, the method further comprises: splitting the current block without determining whether the current block is a boundary block.

According to an example of the second aspect of the invention, the current block is a boundary block when the current block is located only partially within a picture; and the current block is a non-boundary block when the current block is completely located within the picture.

According to an example of the second aspect of the invention, for the encoder side, when performing of the non-transform operation is omitted on the inside part of the current block, the method includes one of the following operations: avoiding/bypassing an transform on residuals of the inside part of the current block in the encoder; setting residuals of the inside part of the current block to zero in the encoder; or using skip mode prediction on the inside part of the current block in the encoder.

According a third aspect of the present invention, a decoding apparatus is provided comprising processing circuitry for carrying out the method of the first aspect and any one of the examples of the first aspect.

According a fourth aspect of the present invention, an encoding apparatus comprising processing circuitry is provided for carrying out the method of the second aspect and any one of the examples of the second aspect.

According a fifth aspect of the present invention, a computer program product is provided comprising a program code for performing the method of the first aspect and any one of the examples of the first aspect, when the computer program runs on a computing device.

According a sixth aspect of the present invention, a computer program product is provided comprising a program code for performing the method of the second aspect and any one of the examples of the second aspect, when the computer program runs on a computing device.

According a seventh aspect of the present invention, a decoding apparatus for boundary partition of a current block of a picture is provided. The decoding apparatus includes: one or more processors; and a non-transitory computer-readable storage medium coupled to the processors and storing programming for execution by the processors, wherein the programming, when executed by the processors, configures the decoder to carry out the method of the first aspect and any one of the examples of the first aspect.

According an eighth aspect of the present invention, an encoding apparatus for boundary partition of a current block of a picture is provided. The encoding apparatus includes: one or more processors; and a non-transitory computer-readable storage medium coupled to the processors and storing programming for execution by the processors, wherein the programming, when executed by the processors, configures the decoder to carry out the method of the second aspect and any one of the examples of the second aspect.

Implementation forms of the third and seventh aspect correspond to the respective implementation forms of the first aspect. Hence, an implementation form of the method comprises the feature(s) of the corresponding implementation form of the decoding apparatus and vice versa. The decoding apparatus may be implemented as a chipset for decoding an encoded video bitstream.

The advantages of the methods according to the first aspect are the same as those for the corresponding implementation forms of the decoding apparatus according to the third aspect and the seventh aspect.

Implementation forms of the fourth and eighth aspect correspond to the respective implementation forms of the second aspect. Hence, an implementation form of the method comprises the feature(s) of the corresponding implementation form of the encoding apparatus. The encoding apparatus may be implemented as a chipset for encoding the image information or video information into an encoded video bitstream.

The advantages of the methods according to the second aspect are the same as those for the corresponding implementation forms of the encoding apparatus according to the fourth aspect and the eighth aspect.

BRIEF DESCRIPTION OF THE DRAWINGS

In the following exemplary embodiments are described in more detail with reference to the attached figures and drawings, in which.

DETAILED DESCRIPTION OF EMBODIMENTS

Figure 1:
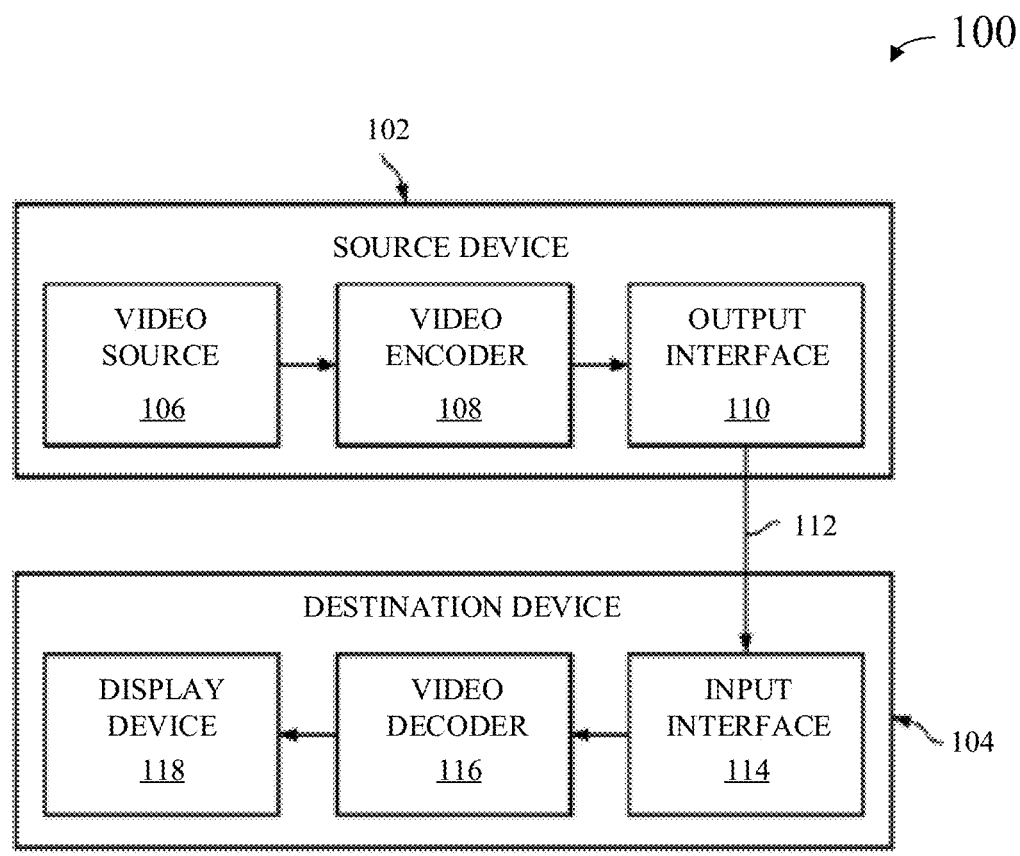
FIG. 1 shows a schematic diagram illustrating an example of a video encoding and decoding system 100.

In the following description, reference is made to the accompanying drawings, which form part of the disclosure, and in which are shown, by way of illustration, specific aspects in which the invention may be placed.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Video coding typically refers to the processing of a sequence of pictures, which form the video or video sequence. The terms picture, image, or frame may be used/are used synonymously in the field of video coding as well as in this application. Each picture is typically partitioned into a set of non-overlapping blocks. The encoding/decoding of the picture is typically performed on a block level where e.g. inter frame prediction or intra frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block (video block) for representation.

Conventional methods, for example, an adaptive method and a forced method, are introduced for picture boundary partition. For the adaptive method, only a quad-tree (QT) and a binary tree (BT) split can be selected for the boundary located block, other splitting modes cannot be chosen. In the adaptive method, different partition syntax is used depending on whether a coding unit is a boundary CU or a non-boundary CU. When a coding unit (CU) is a boundary CU, boundary syntax is used. When CU is a non-boundary CU non-boundary syntax is used. Therefore, the adaptive method has to change the syntax for the boundary CU or boundary coding tree units (CTU). This will break the continuality of context-adaptive binary arithmetic coding (CABAC) engine, and also will limit the partition flexibility, which may reduce the coding efficiency. For the forced method, CTU or CU, which is located on the slice/picture boundaries, will be forced to be split using quad-tree (QT) until the right bottom sample of the leaf node is located within the slice/picture boundary. The forced QT partition does not need to be signaled in the bitstream. The purpose of the forced boundary partition is to make sure all leaf nodes to be encoded and/or decoded are located inside of boundary, so that encoder and decoder can process them. The forced method needs to define specific rules for boundary CTUs/CUs (over engineered), so that it will lead to lower coding efficiency. Both the adaptive method and the forced method are not optimized because of their lower coding efficiency.

The present invention relates to a versatile boundary partition method, and for example, may be performed on top of multiple tree partition structure in hybrid video coding. The versatile boundary partition method uses a non-boundary block partition syntax, e.g. the same block partition syntax as is used for non-boundary blocks, also for boundary blocks, e.g. boundary CTUs or CUs. The method may keep the continuality of the CABAC engine, and may provide more flexible boundary partition. As a result, the coding efficiency will get improved by using the versatile boundary partition method. Such boundary partition may be advantageously used but not limited in still video picture coding and decoding. In the following the term picture will be used for both, still pictures and video pictures. Instead of the term picture also the term image or frame may be used. In the following, embodiments of a system, an encoder, a decoder, and corresponding methods are described, which can implement the versatile boundary partition according to the present disclosure.

Figure 2:
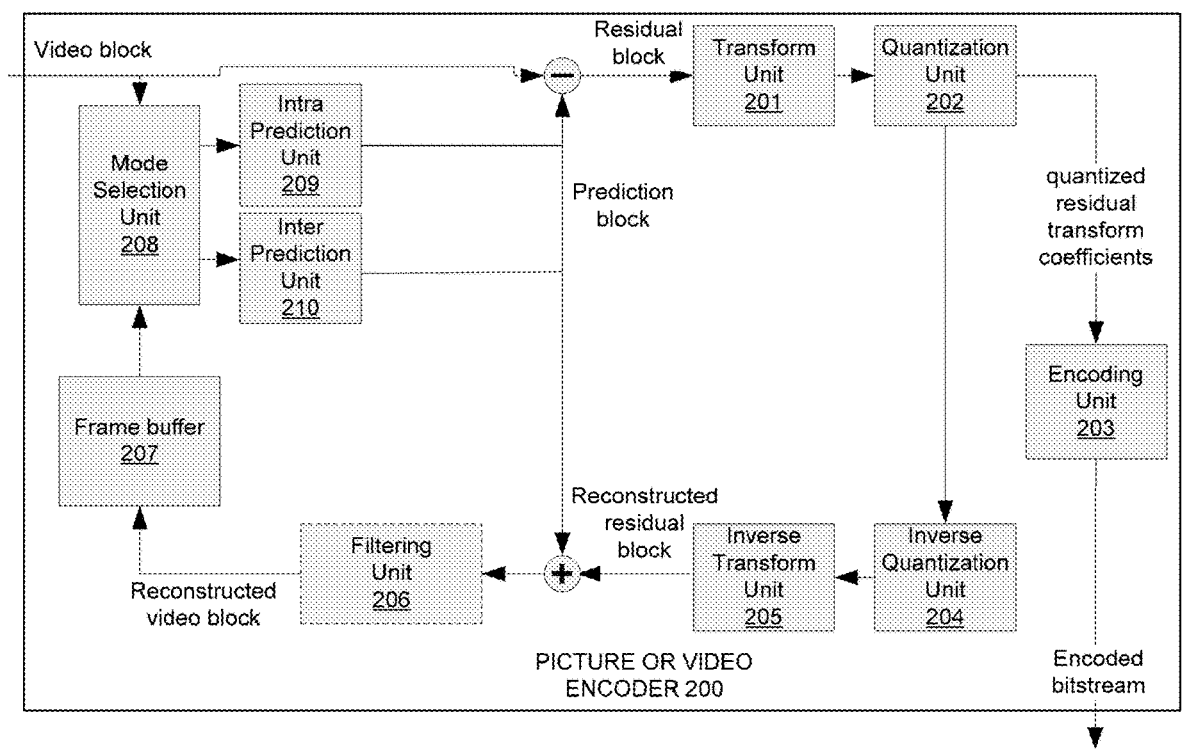
FIG. 2 shows a schematic diagram illustrating an example of a picture/video encoder 200.
Figure 3:
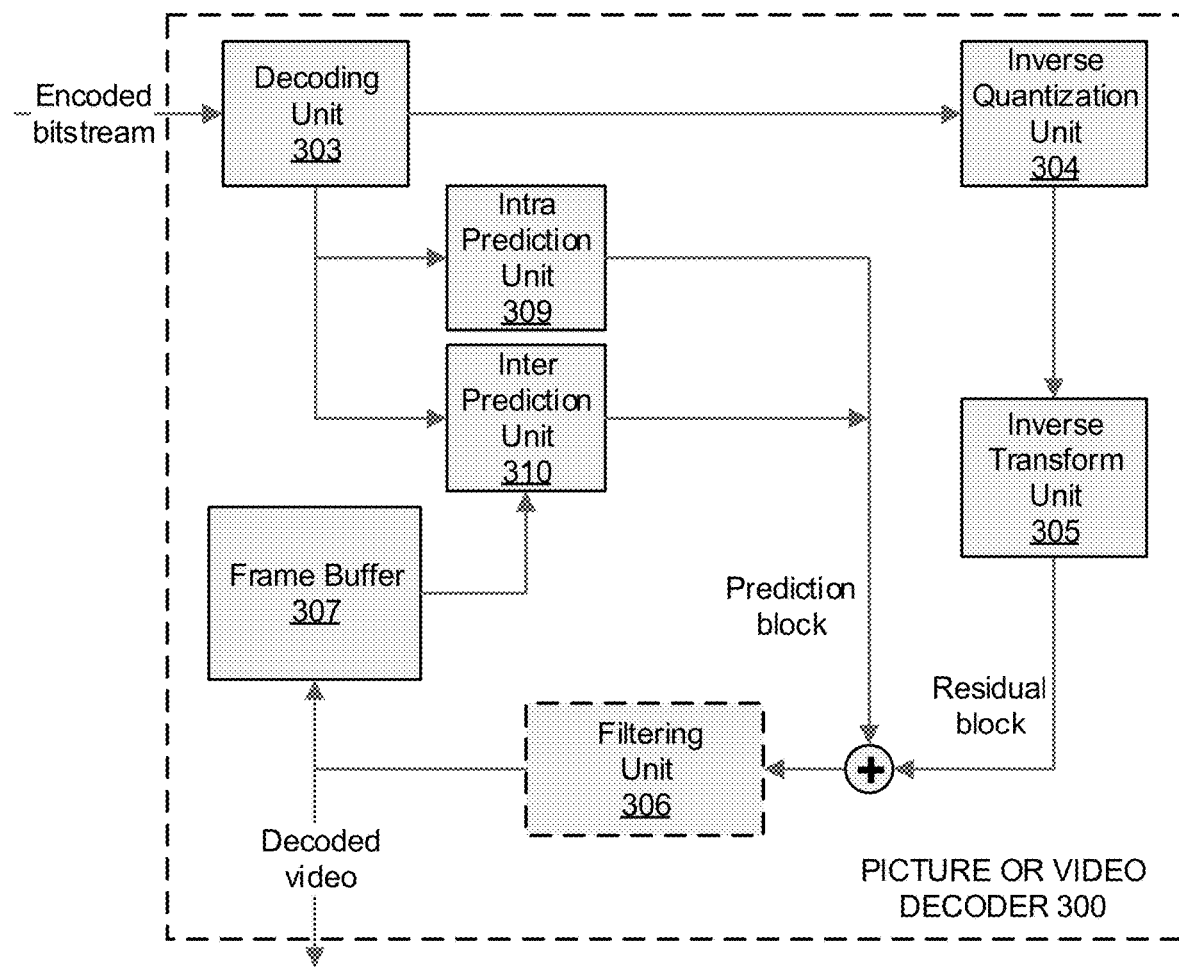
FIG. 3 shows a schematic diagram illustrating an example of a picture/video decoder 300.

FIG. 1 is a block diagram illustrating an example video encoding and decoding system 100 that may utilize the techniques described in this disclosure, including techniques for encoding and decoding boundary partition. The system 100 is not only applied to video encoding and decoding, but also applied to picture encoding and decoding, e.g., of still pictures. As shown in FIG. 1, system 100 includes a source device 102 that generates encoded video data to be decoded at a later time by a destination device 104. Video encoder 200 as shown in FIG. 2, is an example of a video encoder 108 of the source device 102. Video decoder 300 as shown in FIG. 3, is an example of a video decoder 116 of the destination device 104. Source device 102 and destination device 104 may comprise any of a wide range of devices, including desktop computers, notebooks (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 102 and destination device 104 may be equipped for wireless communication.

Destination device 104 may receive the encoded video data to be decoded via a link 112. Link 112 may include any type of medium or device capable of moving the encoded video data from source device 102 to destination device 104. In one example, link 112 may comprise a communication medium to enable source device 102 to transmit encoded video data directly to destination device 104 in real-time. The encoded video data may be modulated according to a communication standard, such as a wireless communication protocol, and transmitted to the destination device 104. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 104.

Alternatively, encoded data may be output from output interface 110 to a storage device (not shown in FIG. 1). Similarly, encoded data may be accessed from the storage device by input interface 114. Destination device 104 may access stored video data from storage device via streaming or download. The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 100 may be configured to support one-way or two-way video transmission to support applications such as video streaming, video playback, video broadcasting, and/or video telephony.

In the example of FIG. 1, source device 102 includes a video source 106, a video encoder 108 and an output interface 110. In some cases, output interface 110 may include a modulator/demodulator (modem) and/or a transmitter. In source device 102, video source 106 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 106 is a video camera, source device 102 and destination device 104 may form so-called camera phones or video phones. However, the techniques described in this disclosure may be applicable to video coding in general, and may be applied to wireless and/or wired applications.

The captured, pre-captured, or computer-generated video may be encoded by video encoder 108. The encoded video data may be transmitted directly to destination device 104 via output interface 110 of source device 102. The encoded video data may also (or alternatively) be stored onto the storage device for later access by destination device 104 or other devices, for decoding and/or playback.

Destination device 104 includes an input interface 114, a video decoder 116, and a display device 118. In some cases, input interface 114 may include a receiver and/or a modem. Input interface 114 of destination device 104 receives the encoded video data over link 112. The encoded video data communicated over link 112, or provided on the storage device, may include a variety of syntax elements generated by video encoder 108 for use by a video decoder, such as video decoder 116, in decoding the video data. Such syntax elements may be included with the encoded video data transmitted on a communication medium, stored on a storage medium, or stored on a file server.

Display device 118 may be integrated with, or external to, destination device 104. In some examples, destination device 104 may include an integrated display device and also be configured to interface with an external display device. In other examples, destination device 104 may be a display device. In general, display device 118 displays the decoded video data to a user, and may comprise any of a variety of display devices such as a liquid crystal display (LCD), a plasma display, an organic light emitting diode (OLED) display, or another type of display device.

Video encoder 108 and video decoder 116 may operate according to any kind of video compression standard, including but not limited to MPEG-2, MPEG-4, ITU-T H.263, ITU-T H.264/MPEG-4, Part 10, Advanced Video Coding (AVC), the High Efficiency Video Coding (HEVC), ITU-T H.266/Next Generation Video Coding (NGVC) standard.

It is generally contemplated that video encoder 108 of source device 102 may be configured to encode video data according to any of these current or future standards. Similarly, it is also generally contemplated that video decoder 116 of destination device 104 may be configured to decode video data according to any of these current or future standards.

Video encoder 108 and video decoder 116 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 108 and video decoder 116 may be included in one or more encoders or decoders, either of which may be integrated as part of a combined encoder/decoder (CODEC) in a respective device.

In video coding specifications, a video sequence typically includes a series of pictures. However, it is noted that the present disclosure is also applicable to fields in case interlacing is applied. Video encoder 108 may output a bitstream that includes a sequence of bits that forms a representation of coded pictures and associated data. Video decoder 116 may receive a bitstream generated by video encoder 108. In addition, video decoder 116 may parse the bitstream to obtain syntax elements from the bitstream. Video decoder 116 may reconstruct the pictures of the video data based at least in part on the syntax elements obtained from the bitstream. The process to reconstruct the video data may be generally reciprocal to the process performed by video encoder 108.

FIG. 2 shows a schematic diagram illustrating an example of a video encoder 200. The video encoder 200 is not only applied to video encoding, but also applied to picture encoding. The video encoder 200 comprises an input for receiving input blocks of frames or pictures of a video stream and an output for generating an encoded video bit stream. The video encoder 200 is adapted to apply prediction, transformation, quantization, and entropy coding to the video stream. The transformation, quantization, and entropy coding are carried out respectively by a transform unit 201, a quantization unit 202 and an encoding unit 203 so as to generate as an output the encoded video bit stream.

The video stream corresponds to a plurality of frames, wherein each frame is divided into blocks of a certain size that are either intra-coded or inter-coded. The blocks of, for example, the first frame of the video stream are intra-coded by means of an intra prediction unit 209. An intra frame is coded using only the information within the same frame, so that it can be independently decoded and it can provide an entry point in the bit stream for random access. Blocks of other frames of the video stream are inter-coded by means of an inter prediction unit 210: information from coded frames, which are called reference frames, are used to reduce the temporal redundancy, so that each block of an inter-coded frame is predicted from a block of the same size in a reference frame. A mode selection unit 208 is adapted to select whether a block of a frame is to be processed by the intra prediction unit 209 or the inter prediction unit 210.

For performing inter prediction, the coded reference frames are processed by an inverse quantization unit 204, an inverse transform unit 205, a filtering unit 206 (optional) so as to obtain the reference frames that are then stored in a frame buffer 207. Particularly, reference blocks of the reference frame can be processed by these units to obtain reconstructed reference blocks. The reconstructed reference blocks are then recombined into the reference frame.

The inter prediction unit 210 comprises as input a current frame or picture to be inter coded and one or several reference frames or pictures from the frame buffer 207. Motion estimation and motion compensation are applied by the inter prediction unit 210. The motion estimation is used to obtain a motion vector and a reference frame based on certain cost function. The motion compensation then describes a current block of the current frame in terms of the transformation of a reference block of the reference frame to the current frame. The inter prediction unit 210 outputs a prediction block for the current block, wherein said prediction block minimizes the difference between the current block to be coded and its prediction block, i.e. minimizes the residual block. The minimization of the residual block is based e.g., on a rate-distortion optimization procedure.

The difference between the current block and its prediction, i.e. the residual block, is then transformed by the transform unit 201. The transform coefficients are quantized by the quantization unit 202 and entropy coded by the encoding unit 203. The encoded video bit stream comprises intra coded blocks and inter coded blocks.

FIG. 3 shows a schematic diagram illustrating an example of a video decoder 300. The video decoder 300 is not only applied to video decoding, but also applied to picture decoding. The video decoder 300 comprises particularly a frame buffer 307, an inter prediction unit 310. The frame buffer 307 is adapted to store at least one reference frame obtained from the encoded video bit stream. The inter prediction unit 310 is adapted to generate a prediction block of a current block of a current frame from a reference block of the reference frame.

The decoder 300 is adapted to decode the encoded video bit stream generated by the video encoder 200, and both the decoder 300 and the coder 200 generate identical predictions. The features of the frame buffer 307, the inter prediction unit 310 are similar to the features of the frame buffer 207, the inter prediction unit 210, of FIG. 2.

Particularly, the video decoder 300 comprises units that are also present in the video encoder 200 like e.g., an inverse quantization unit 304, an inverse transform unit 305, a filtering unit 306 (optional) and an intra prediction unit 309, which respectively correspond to the quantization unit 202, the transform unit 201, the filtering unit 206 and the intra prediction unit 209 of the video encoder 200. A decoding unit 303 is adapted to decode the received encoded video bit stream and to correspondingly obtain quantized transform residual coefficients. The quantized transform residual coefficients are fed to the inverse quantization unit 304 and an inverse transform unit 305 to generate a residual block. The residual block is added to a prediction block and the addition is fed to the filtering unit 306 to obtain the decoded video. Frames of the decoded video can be stored in the frame buffer 307 and serve as a reference frame for inter prediction.

The video encoder 200 may split the input video frame into blocks before encoding. The term "block" in this disclosure is used for any type block or for any depth block, for example, the term "block" is included but not limited to root block, block, sub-block, leaf node, and etc. The blocks to be coded do not necessarily have the same size. One picture may include blocks of different sizes and the block rasters of different pictures of video sequence may also differ. FIGS. 4A-4E illustrate Coding Tree Unit (CTU)/Coding Unit (CU) splitting mode in VVC.

Figure 4A:
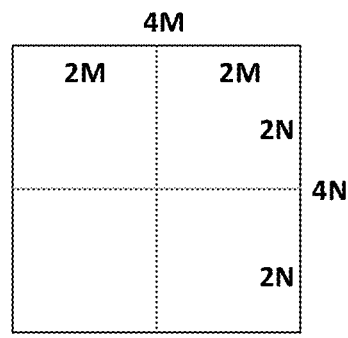
FIG. 4A is a schematic diagram illustrating a quad-tree (QT) split according to an embodiment of the present disclosure.

FIG. 4A illustrates a block partition structure by adopting a quad-tree (QT) split. The QT is a tree structure for block partition in which a node of size 4M×4N may be split into four child nodes of size 2M×2N.

Figure 4B:
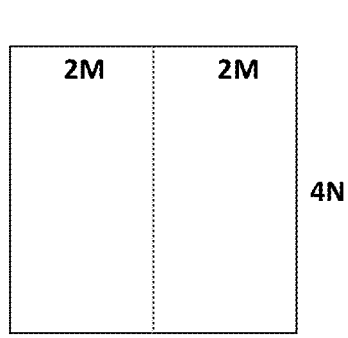
FIG. 4B is a schematic diagram illustrating a binary tree (BT) split in vertical orientation according to an embodiment of the present disclosure.

FIG. 4B illustrates a block partition structure by adopting a binary tree (BT) split in vertical orientation.

Figure 4C:
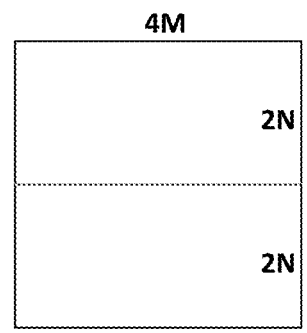
FIG. 4C is a schematic diagram illustrating a binary tree (BT) split in horizontal orientation according to an embodiment of the present disclosure.

FIG. 4C illustrates a block partition structure by adopting a binary tree (BT) split in horizontal orientation. The BT is a tree structure for block partition in which a node of size 4M×4N may either be horizontally split into two child nodes of size 4M×2N or vertically split into two child nodes of size 2M×4N.

Figure 4D:
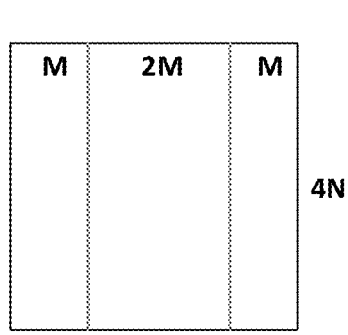
FIG. 4D is a schematic diagram illustrating a ternary tree (TT) split in vertical orientation according to an embodiment of the present disclosure.

FIG. 4D illustrates a block partition structure by adopting a ternary tree (TT) split in vertical orientation.

Figure 4E:
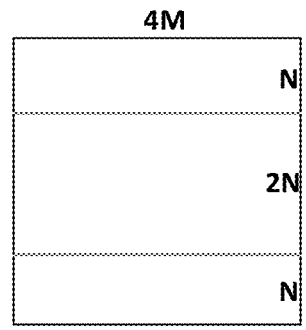
FIG. 4E is a schematic diagram illustrating a ternary tree (TT) split in horizontal orientation according to an embodiment of the present disclosure.

FIG. 4E illustrates block partition structure by adopting a ternary tree (TT) split in horizontal orientation. The TT is a tree structure for block partition in which a node of size 4M×4N may either be horizontally split into three child nodes of size 4M×N, 4M×2N and 4M×N, respectively; or vertically split into three child nodes of size M×4N, 2M×4N and M×4N, respectively. Among the three child nodes shown in FIG. 4D or FIG. 4E, the largest node is positioned in the center.

Quad-tree plus binary tree (QTBT) is a quad-tree plus binary tree structure in which a block is first partitioned using quad-tree split, then each quad-tree child node may be further partitioned using binary tree split. Quad-tree plus binary tree or ternary tree (QT-BT/TT) is a quad-tree plus binary tree or ternary tree structure in which a block is first partitioned using quad-tree split, then each quad-tree child node may be further partitioned using binary tree or ternary tree split.

For a block associated with a particular depth, encoder 200 determines which partition type (including no further split) is used and signals the determined partition type explicitly or implicitly (e.g., the partition type may be derived from predetermined rules) to decoder 300. Encoder 200 may determine the partition type to use, for example, based on checking rate-distortion costs for the block using different partition types.

The following versatile boundary partition is disclosed in relation to video coding (or picture of video coding), and also for still image coding (or still picture coding).

An embodiment of the versatile boundary partition in this disclosure is defined by the following rules:

no matter whether the block is a boundary block (isB) or a non-boundary block (in other words, not a boundary block, (noB)), a block partition syntax (which can be also referred to as a conventional non-boundary block partition syntax, or regular block partition syntax, or unchanged regular block partition syntax) is used, where isB indicates that a CTU/CU located at a picture boundary and only partially within the picture; noB indicates that the CTU/CU is completely located within the picture;

(Option 1) if the no split mode is parsed for the boundary CTU/CU, it is to be checked whether an inside part of the boundary CTU/CU (within the picture/video frame) is transformable, and no transform/inverse transform operation is performed on the inside part of the boundary CTU/CU (within the picture/video frame), i.e. a transform/inverse transform operation is omitted or skipped. Otherwise inverse transform is performed on the inside part of the boundary CTU/CU (Option 2) if the no split mode is parsed for the boundary CTU/CU, a transform/inverse transform operation is omitted or skipped on the inside part of the boundary CTU/CU (within the picture/video frame).

In both Option 1 and Option 2, if performing of a transform/inverse transform operation is omitted and thus not performed, a different operation other than a transform/inverse transform operation may be performed. Such operations, which are performed instead of the transform/inverse transform operation when the transform/invers transform operation is omitted, are referred to in this disclosure as "non-transform operation" and, respectively, "non-inverse transform operation".

Whether or not a block such as a CTU/CU is a boundary block or boundary CTU/CU is determined, for instance, by comparing the position of the CTU (in particular, a suitable pixel position in the CTU) with the position of the boundary (or the vertical/horizontal image size in samples). In the code, the CTU has fixed pre-defined size, for instance 128×128 or 64×64 as in HEVC. The picture will be split into CTUs without overlapping. As an embodiment, the encoder/decoder will check the left-top pixel of the CTU, and compare it with the boundary. If the left-top pixel is located inside of the picture boundary, the CTU is not an outside block (non-outside block). If the left-top pixel is not located inside of the picture boundary, the CTU is an outside block (outside). For the CTU which is not an outside block, the encoder/decoder will check the right-bottom pixel of the CTU, and compare it with the boundary. If the right-bottom pixel is located outside of the picture boundary, the CTU is a boundary CTU (isB). If the right-bottom pixel is not located outside of the picture boundary, the CTU is a non-boundary CTU (noB). In this example, the encoder/decoder will check the left-top pixel first, and to determine the current CTU is an outside CTU or non-outside CTU. For the non-outside CTU, the encoder/decoder will check the right-bottom pixel second, and to determine the current CTU is a boundary block (isB) or a non-boundary block (noB). This way of determining whether a partitioning block is a boundary block is just an example. There are other methods to determine whether a partitioning block is a boundary block or not. Furthermore, depending on a direction in which the picture is processed, in the above method, the left-top pixel and the right-bottom pixel may be replaced by the right-top and the left-bottom pixel or some other pair of pixels connected by a diagonal line connecting the corners of the block.

Moreover, this way of determining whether a partitioning block is located on a boundary or not is not only applied to CTUs, but can also be used for CUs and any partition blocks resulting from splitting a CTU or some block within the partitioning hierarchy.

When the transform/inverse transform operation is omitted, a non-transform/non-inverse transform operation, which is performed, for example, on an inside part of the current block, in the present invention comprises such schemes as follows:

Transform bypass mode: Bypass/Avoid transform processing on residual block of the inside part of the current block in the encoder and inverse-transform processing on residuals of the inside part of the current block in the decoder, and maintain the quantization processing and encoding processing for residual block. In other words, the residuals of the inside part of the current block are still encoded in the bit stream, but not transformed. For example, in current versatile video coding next generation standard, the transform bypass may be controlled by transform_bypass_flag, if the flag is set to 1, transform bypass is enabled.

Non-transform coefficients: Set residual values of the inside part of the current block as 0 in the encoder or the decoder, the prediction mode is still unchanged. This mode could be achieved, for example, by setting cbf_flag as 0.

Skip mode: Set the residual coefficients as 0, at the same time, using Skip mode as the prediction mode on the inside part of current block in the encoder or the decoder. Skip mode is controlled by skip_flag.

TABLE 1

| Scheme\description | Encoder side (non-transform operation) | Decoder side (non-inverse transform operation) |
|---|---|---|
| Transform bypass | The prediction mode of current block is unaffected (e.g. Operations of mode selection unit 208, Intra prediction unit 209 and Inter prediction unit 210 are unaffected). Residual block is calculated between prediction block and original block as usual. Bypass/avoid transform processing on the residual block in the encoder (i.e. The transform unit 201 is bypassed for processing the current residual block). The quantization (202) for residual block still remains and the quantized residuals are still signaled/encoded in the bitstream. The transform bypass is controlled, for example, by transform_bypass_flag (E.g. If the transform_bypass_flag is set as 1, the transform bypass mode for the current block is enabled). | Parse the prediction mode from the bitstream. Parse, for example, the transform_bypass_flag as 1 from the bitstream. Parse the residual block from the bitstream (e.g. By the decoding unit 303) and de-quantize the residuals (e.g. by inverse quantization unit 304). Since transform bypass is enabled, avoid inverse-transform processing on the residuals. Reconstruct the block with prediction block and residual block (e.g. By using intra prediction unit 309, and inter prediction unit 310 of FIG. 3). |
| Non-transform coefficients | The prediction mode of current block is unaffected (e.g. Operations of mode selection unit 208, Intra prediction unit 209 and Inter prediction unit 210 are unaffected). The residual block between prediction block and original block is omitted (e.g. The | Parse the prediction mode from the bitstream. Parse, for example, the cbf_flag as 0 from the bitstream. No residuals (i.e. All residuals are 0) since cbf_flag is 0, therefore no de-quantization and inverse-transformation (e.g. the |

TABLE 1-continued

| Scheme\description | Encoder side (non-transform operation) | Decoder side (non-inverse transform operation) |
|---|---|---|
| | values of residual block are all set to 0). No residual transform processing in the encoder (e.g. Transform unit 201 is not used). No quantization processing (e.g. Quantization unit 202 is not used). The residuals omitting is controlled, for example, by the cbf_flag (e.g. If cbf_flag is set as 0, the residuals of current block are all set to 0). | inverse quantization unit 304 and inverse transform unit 305 are not used). Reconstruct the block with prediction block (e.g. By using intra prediction unit 309, and inter prediction unit 310 of FIG. 3). |
| Skip mode | The prediction mode of current block is limited to skip mode. No residuals between prediction block and original block for skip mode. No residual transform processing in the encoder (e.g. Transform unit 201 is not used). No quantization processing (e.g. Quantization unit 202 is not used). The skip mode is controlled for example, by skip_flag (e.g. If skip_flag is set as 1, skip mode for current block is enabled). | Parse, for example, skip_flag as 1 from the bitstream. No residuals since skip_flag is 1, therefore no de-quantization and inverse-transform (e.g. The inverse quantization unit 304 and inverse transform unit 305 in FIG. 3 are not used). Reconstruct the block with the skip mode prediction. |

The term "block" in the present invention is a generalized term which includes but is not limited to root block, block, sub-block, leaf node, and etc.

The expression "an inside part of the boundary CTU within the picture/video frame" in the present invention corresponds to a region of a boundary block located inside a picture/video frame, i.e. inside of the picture boundary. This corresponds to the inside part of the boundary block shown in FIG. 5.

The above applies to both encoder 200 and decoder 300. The following processing 600-900 as well as 600B-900B explain the above rules and the pseudo code in more detail. The processing 600 and 700 are illustrations of an embodiment of a method using the versatile boundary partition processing, which may be performed by the video encoder 200 as shown in FIG. 2 and the video decoder 300 as shown in FIG. 3 separately.

Figure 6A:
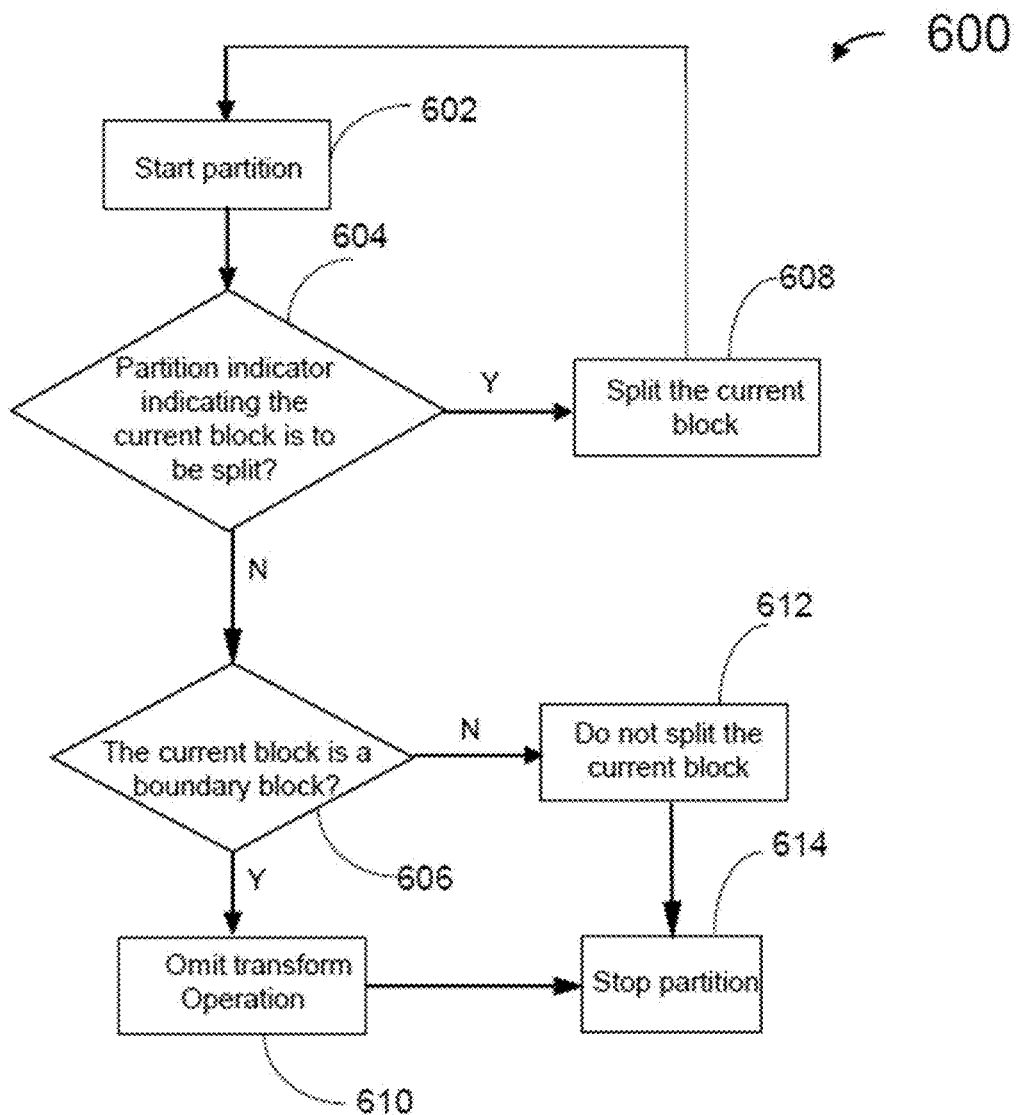
FIG. 6A is a flowchart illustrating an embodiment 600 of a method for encoding a bitstream.

FIG. 6A is an illustration of an embodiment 600 of a method using the versatile boundary partition processing, which may be performed by the source device 102 as shown in FIG. 1, by the video encoder 200 as shown in FIG. 2 or any other encoder, e.g. a still picture encoder.

Figure 10:
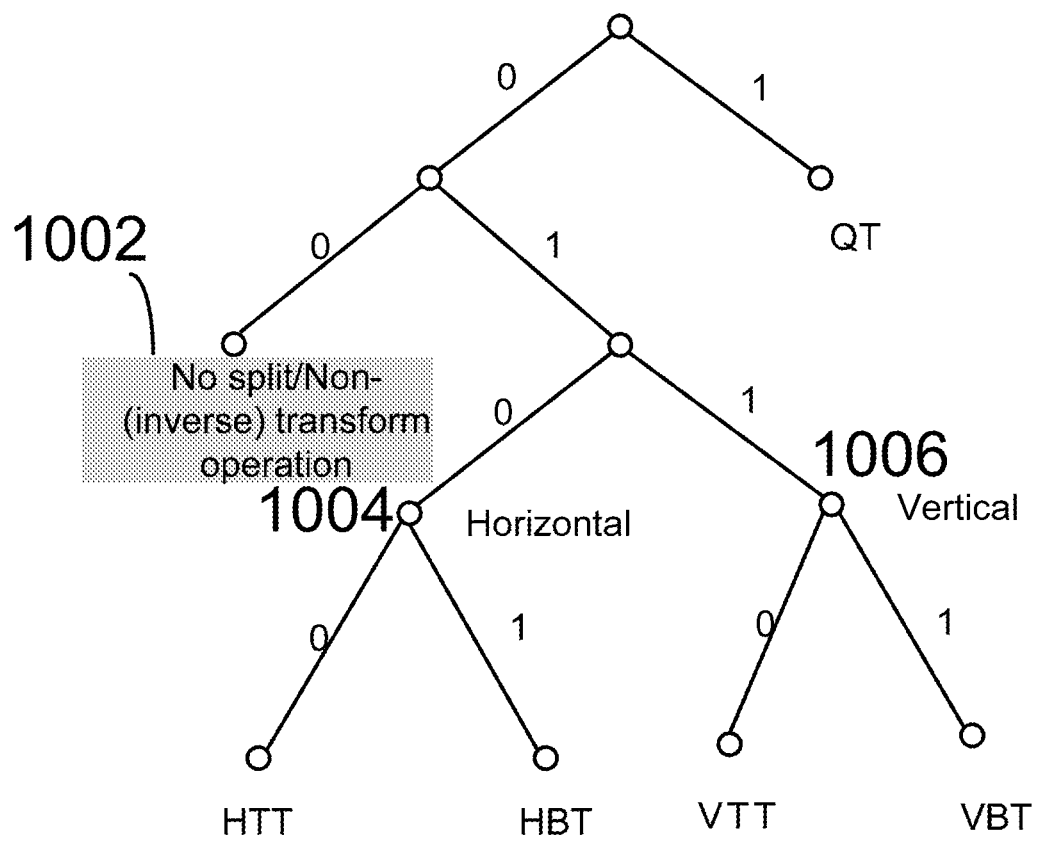
FIG. 10 is a schematic diagram illustrating an example of a block partition syntax according to an embodiment.

In the method of FIG. 6A, the method is initiated at step 602 to start the partition. For a current block, at step 604, the encoder determines a partition indicator, where the partition indicator indicates whether the current block is to be split. The partition indicator may be determined according to a block partition syntax. An embodiment of the block partition syntax is shown in FIG. 10. The partition indicator includes but is not limited to a partition flag comprising one or more bits. The encoder may perform Rate-Distortion Optimization (RDO) cost estimations to determine the partition indicator.

For instance, the cost function may be a measure of a difference between the current block and the candidate block, i.e. a measure of the residual of the current block with respect to the candidate block. For example, the cost function may be a sum of absolute differences (SAD) between all pixels (samples) of the current block and all pixels of the candidate block in the candidate reference picture. However, in general, any similarity metric may be employed, such as mean square error (MSE) or structural similarity metric (SSIM).

However, the cost function may also be the number of bits that are necessary to code such inter-block and/or distortion resulting from such coding. Thus, a rate-distortion optimization procedure may be used to decide on the motion vector selection and/or in general on the encoding parameters such as whether to use inter or intra prediction for a block and with which settings.

In this versatile boundary partition processing, no matter whether the current block is a boundary block (isB) or a non-boundary block (noB), the partition indicator of a same partition syntax is used (partition syntax may also be referred to as joint or common partition syntax as the syntax is used for both kinds of blocks, boundary and non-boundary blocks), where isB indicates that the block, e.g. a CTU/CU (i.e. CTU or CU), is located at a picture boundary and only partially within the picture; and noB indicates that the block, e.g. a CTU/CU, is completely located within the picture, which may include that the non-boundary block is located at the picture boundary but does not extend beyond the boundary. Therefore, the encoder can determine the partition indicator without firstly determining whether the current block is a boundary block.

When the partition indicator indicates that the current block is not to be split, the encoder determines whether the current block is a boundary block at step 606. The determination may be done for any kind of a block, e.g., a coding unit (CU), a coding tree unit (CTU), including any kind of a block that has been partitioned, split or other way derived from a coding tree unit (or any other kind of a root block).

When the partition indicator indicates that the current block is to be split, the encoder splits the current block at step 608, without determining whether the current block is a boundary block. Then the procedures return to step 602 to start partition of next level.

Figure 5:
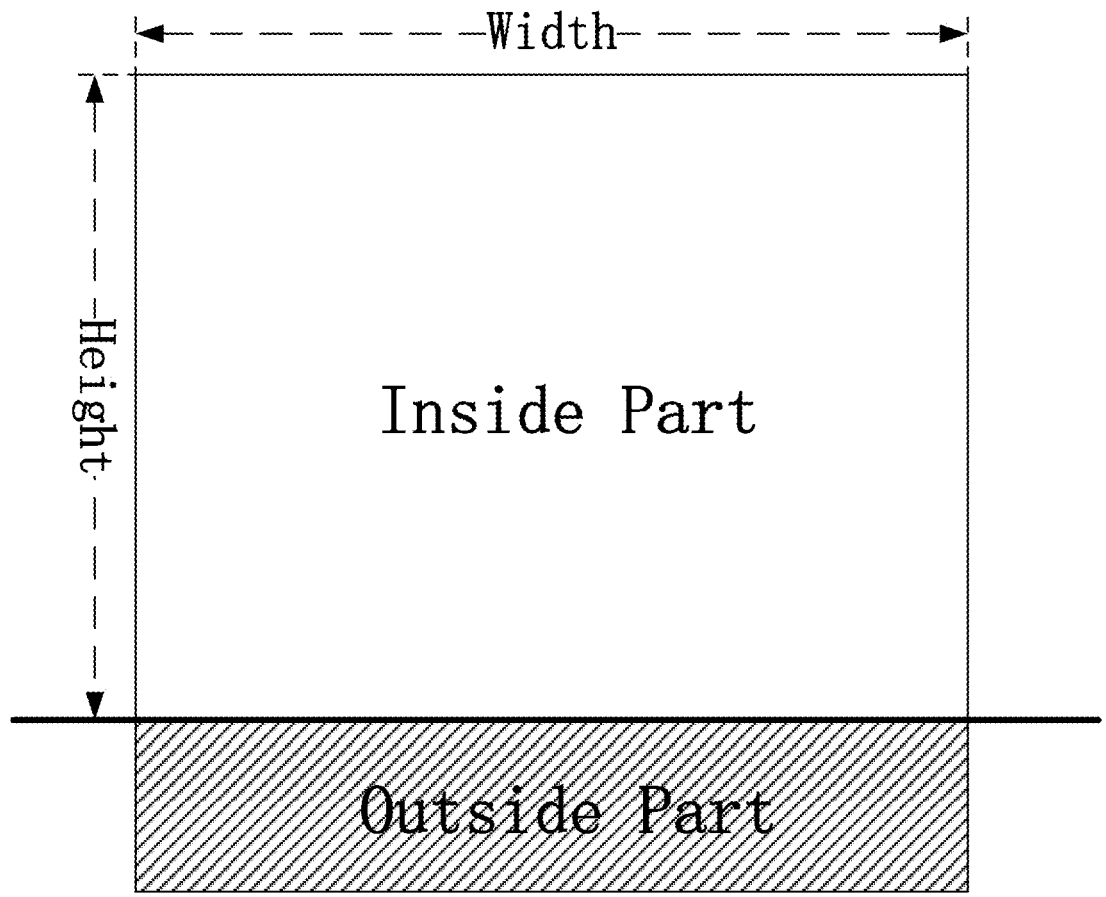
FIG. 5 is a schematic diagram illustrating a partial CU with both inside part and outside part.

When the current block is a boundary block, the partition indicator of the block partition syntax indicates that the non-transform operation is to be performed on an part of the current block (within in the frame, i.e. inside part of the boundary block in the frame as shown in FIG. 5, wherein e.g. "frame" means picture or video frame). As such, when the encoder determines that the current block is a boundary block, the encoder performs omits performing of a transform operation on the inside part of the current block (within in the picture/video frame) at step 610. If all boundary partitioned leaf nodes are entirely inside of the picture boundary, the method stops partition at step 614. It means, no further partition (leaf node) is executed after the boundary partition is performed. This will preserve the largest possible leaf nodes as well as facilitate obtaining that all leaf nodes are entirely inside of the picture boundary. When the current block is not a boundary block, the partition indicator in the block partition syntax indicates that the current block is not to be split. As such, when the encoder determines that the current block is not a boundary block, the encoder does not split the current block, and performs transform processing (e.g., Discrete Cosine Transform (DCT) or Discrete Sine Transform (DST), etc.) as usual on the current block of the encoding process at step 612. After step 612, the method may stop partition at step 614 after receiving an indicator to indicate no further split.

After step 604, the encoder may encode a value of the partition indicator to the bitstream, and send the bitstream to decoder (Not shown in FIG. 6A).

As discussed above, in this versatile boundary partition processing, it does not matter whether the block is a boundary block or a non-boundary block. Therefore, the encoder can use a regular (e.g. non-boundary) block partition syntax. The encoder in the method 600 may use an unchanged regular (e.g. non-boundary) block partition syntax to partition boundary located CTU/CU, the semantics of the partition syntax can be (at least partially) different for boundary and non-boundary blocks, e.g. CTU/CU. The partition indicator may be indicated by using one or more bits in the bitstream. Taking 00 as an example: for a normal or non-boundary block (e.g. CTU/CU), 00 indicates to perform no splitting (no split); for a boundary block (e.g. CTU/CU), 00 indicates to perform non-transform operation. Since the regular block partition syntax is used, this versatile boundary partition can keep the continuality of the CABAC engine, and more flexible boundary partition can be achieved.

Figure 6B:
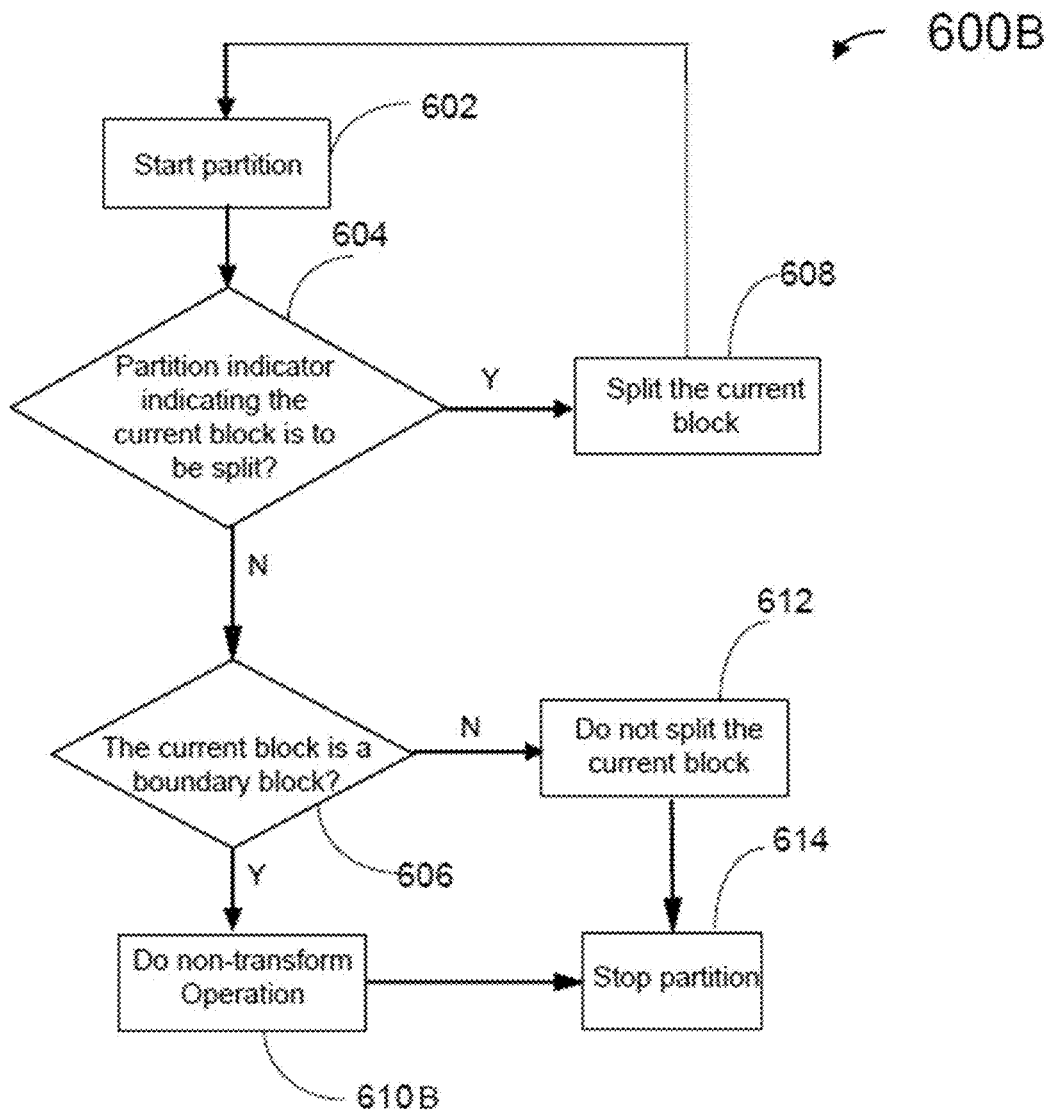
FIG. 6B is a flowchart illustrating an embodiment 600B of a method for encoding a bitstream.

FIG. 6B shows an embodiment of the present disclosure where the encoder performs a non-transform operation on the inside part of the current block (within in the picture/video frame) at step 610B when omitting performing of the transform operation. The remaining steps, 602 to 608 and 612 to 614, of the processing 600B are the same as shown in FIG. 6A.

Accordingly, the disclosure includes a method for boundary partition of a current block of a picture. The method includes that an encoder determines a partition indicator, wherein the partition indicator indicates whether the current block is to be split; determines 606 whether the current block is a boundary block; performs 610B a non-transform operation on a part of the current block (i.e., the inside part of the current block) when the partition indicator indicates that the current block is not to be split and the current block is a boundary block, wherein the part of the block is located within the picture; and generates a bitstream including the partition indicator.

Moreover, the disclosure includes a method for boundary partition of a current block of a picture. The method includes that an encoder determines a partition indicator, wherein the partition indicator indicates whether the current block is to be split; determines 606 whether the current block is a boundary block when the partition indicator indicates that the current block is not to be split; and performs 610B a non-transform operation on a part of the current block (i.e., the inside part of the current block) when the current block is a boundary block, wherein the part of the block is located within the picture; and generates a bitstream including the partition indicator.

Figure 7A:
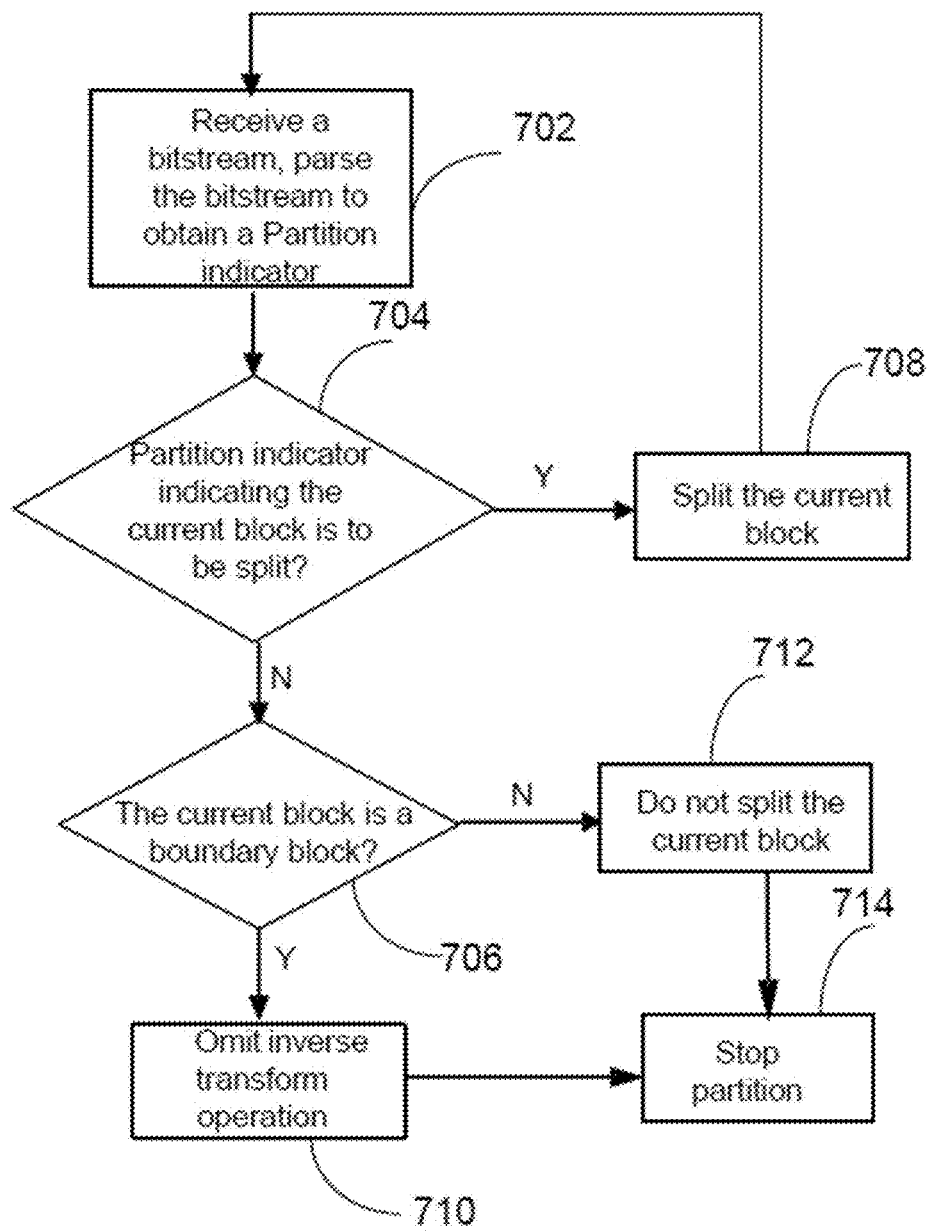
FIG. 7A is a flowchart illustrating an embodiment 700 of a method for decoding a bitstream.

FIG. 7A is an illustration of an embodiment 700 of a method using the versatile boundary partition processing, which may be performed by the destination device 104 as shown in FIG. 1, the video decoder 300 as shown in FIG. 3 or any other decoder, e.g. a still picture decoder.

In the method 700 of FIG. 7A, the method is initiated at step 702 to receive the bitstream, for example, from an encoder, where the bitstream includes a partition indicator and picture data. The decoder may parse the bitstream to obtain the partition indicator at step 702. At step 704, the decoder determines whether the partition indicator indicates that a current block is to be split or not. The decoder may determine whether the partition indicator indicates that a current block is to be split according to a non-boundary block partition syntax. The partition indicator includes but is not limited to a partition flag comprising one or more bits.

In this versatile boundary partition processing, no matter whether the current block is a boundary block (isB) or a non-boundary block (noB), the partition indicator of a same partition syntax is used, where isB indicates that the block, e.g. a CTU/CU, is located at a picture boundary and only partially within the picture; and noB indicates that the block, e.g. CTU/CU, is completely located within the picture, which may include that the non-boundary block is located at the picture boundary but does not extend beyond the boundary. Therefore, the decoder can determine the partition indicator without firstly determining whether the current block is a boundary block.

Determined that (e.g., the partition indicator indicates) the current block is not to be split, the decoder determines whether the current block is a boundary block at step 706. Similarly as for the boundary block in step 606.

Determined that (e.g., the partition indicator indicates) the current block is to be split, the decoder splits the current block at step 708, without determining whether the current block is a boundary block. Then the procedures returns to step 702.

When the current block is a boundary block, the partition indicator of the non-boundary block partition syntax indicates that the boundary partition is to be performed on the current block. As such, when the decoder determines that the current block is a boundary block, the decoder omits performing an inverse transform operation on the current block at step 710. If all boundary partitioned leaf nodes are entirely inside of the picture boundary, the method stops partition at step 714. It means, no further partition (leaf node) is executed after the boundary partition is performed.

When the current block is not a boundary block, the partition indicator in the block partition syntax indicates that the current block is not to be split. As such, when the decoder determines the current block is not a boundary block, the decoder does not split the current block and performs inverse transform processing as usual (e.g., Inverse-Discrete Cosine Transform (DCT) or Inversed-Discrete Sine Transform (DST), etc.) on the current block of the decoding process at step 712. After step 712, the method may stop partition at step 714 after receiving an indicator to indicate no further split.

Figure 7B:
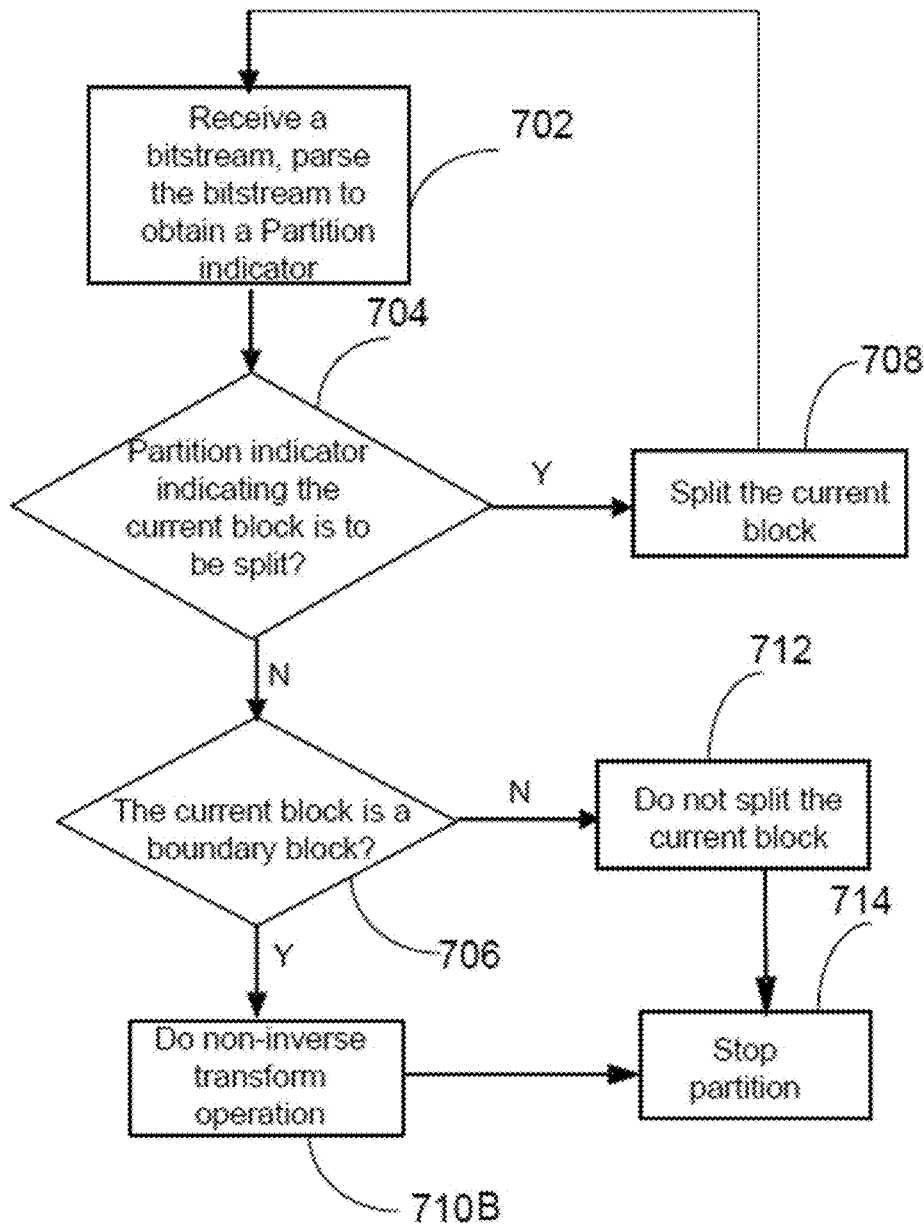
FIG. 7B is a flowchart illustrating an embodiment 700B of a method for decoding a bitstream.

FIG. 7B shows an embodiment of the present disclosure where the decoder performs a non-transform operation on the inside part of the current block (within in the picture/video frame) at step 710B when omitting performing of the transform operation. The remaining steps, 702 to 708 and 712 to 714, of the processing 700B are the same as shown in FIG. 7A.

Accordingly, the disclosure includes a method for boundary partition of a current block of a picture. The method includes that a decoder obtains 702 a partition indicator from a received bitstream, determines 704, 706 whether the partition indicator indicates that the current block is to be split and whether the current block is a boundary block, and performs 710B a non-inverse transform operation on a part of the current block when the partition indicator indicates that the current block is not to be split and the current block is a boundary block, wherein the part of the block is located within the picture.

Moreover, a method for boundary partition of a current block of a picture is provided. The method includes that a decoder obtains 702 a partition indicator from a received bitstream; determines 704 whether the partition indicator indicates that the current block is to be split; determines 706 whether the current block is a boundary block when the partition indicator indicates that the current block is not to be split; and performs 710B a non-inverse transform operation on a part of the current block when the current block is a boundary block, wherein the part of the block is located within the picture (i.e. inside part of the block).

As discussed above, in this versatile boundary partition processing, the decoder determines whether the partition indicator indicates that the current block is to be split or not. Therefore, the decoder can parse and use a regular (e.g. a non-boundary) block partition syntax. Referring to FIG. 10 as an example, the decoder in the method 700 or 700B may use an unchanged regular block partition syntax to partition boundary located blocks, e.g. CTU/CU, wherein the semantics of the block partition syntax can be different (at least partially) for boundary and non-boundary blocks, e.g. CTU/CU. The partition indicator may be indicated by using one or more bits in the bitstream. Taking 00 as an example: for normal or non-boundary block (e.g. CTU/CU), 00 indicates to perform no splitting (no split); for a boundary block (e.g. CTU/CU), 00 indicates to perform non-inverse transform operation. Since the regular block partition syntax is used, this versatile boundary partition can keep the continuality of the CABAC engine, and more flexible boundary partition can be achieved.

As an example of setting cbf_flag (using Non-transform coefficients scheme in Table-1) to implement non-inverse transform operation, comparing the version 2 of draft text 2 of VVC [JVET-K1001-v2] (incorporated herein by reference), the changes of this solution are listed as follows (the underlined text marks newly-added text, the text with a breakthrough marks text to be deleted):

7.3.4.3 Coding Quadtree Syntax

|  | Descriptor |
|---|---|
| coding_quadtree( x0, y0, log2CbSize, cqtDepth, treeType ) { | |
|   if( ( | |
|     log2CbSize > MinQtLog2SizeY ) | |
|       qt_split_cu_flag[ x0 ][ y0 ] | ae(v) |
|   } | |
|   if( qt_split_cu_flag[ x0 ][ y0 ] ) { | |
|     x1 = x0 + ( 1 << ( log2CbSize − 1 ) ) | |
|     y1 = y0 + ( 1 << ( log2CbSize − 1 ) ) | |
|     coding_quadtree( x0, y0, log2CbSize − 1, cqtDepth + 1, treeType ) | |
|     if( x1 < pic_width_in_luma_samples ) | |
|     coding_quadtree( x1, y0, log2CbSize − 1, cqtDepth + 1, treeType ) | |
|     if( y1 < pic_height_in_luma_samples ) | |
|     coding_quadtree( x0, y1, log2CbSize − 1, cqtDepth + 1, treeType ) | |
|     if( x1 < pic_width_in_luma_samples && y1 < pic_height_in_luma_samples ) | |
|     coding_quadtree( x1, y1, log2CbSize − 1, cqtDepth + 1, treeType ) | |
|   } else | |
|     multi_type_tree( x0, y0, 1 << log2CbSize, 1 << log2CbSize, 0, 0, 0, treeType ) | |
| } | |

7.3.4.4 Multi-type tree syntax

|  | Descriptor |
|---|---|
| multi_type_tree( x0, y0, cbWidth, cbHeight, mttDepth, partIdx, treeType ) { | |
|   if( allowSplitBtVer \|\| allowSplitBtHor \|\| allowSplitTtVer \|\| allowSplitTtHor ) | |
|     mtt_split_cu_flag | ae(v) |
|   if( mtt_split_cu_flag ) { | |
|     if( ( allowSplitBtHor \|\| allowSplitTtHor ) && | |
|       ( allowSplitBtVer \|\| allowSplitTtVer ) ) | |
|       mtt_split_cu_vertical_flag | ae(v) |

| | Descriptor |
|---|---|
| ```
        if( ( allowSplitBtVer && allowSplitTtVer &&
mtt_split_cu_vertical_flag ) ||
            ( allowSplitBtHor && allowSplitTtHor
&& !mtt_split_cu_vertical_flag ) )
                mtt_split_cu_binary_flag
            if( MttSplitMode[ x0 ][ y0 ][ mttDepth ] = = SPLIT_BT_VER ) {
                x1 = x0 + ( cbWidth >> 1 )
            multi_type_tree( x0, y0, cbWidth / 2, cbHeight, mttDepth + 1, 0, treeType )
                if( x1 < pic_width_in_luma_samples )
            multi_type_tree( x1, y0, cbWidth / 2, cbHeightY, mttDepth + 1, 1, treeType )
            } else if( MttSplitMode[ x0 ][ y0 ][ mttDepth ] = =
SPLIT_BT_HOR ) {
                y1 = y0 + ( cbHeight >> 2 )
            multi_type_tree( x0, y0, cbWidth, cbHeight / 2, mttDepth + 1, 0, treeType )
                if( y1 < pic_height_in_luma samples )
            multi_type_tree( x0, y1, cbWidth, cbHeight / 2, mttDepth + 1, 1, treeType )
            } else if( MttSplitMode[ x0 ][ y0 ][ mttDepth ] = =
SPLIT_TT_VER ) {
                x1 = x0 + ( cbWidth / 4 )
                x2 = x0 + ( 3 * cbWidth / 4 )
            multi_type_tree( x0, y0, cbWidth / 4, cbHeight, mttDepth + 1, 0, treeType )
            if( x1 < pic_width_in_luma_samples )
            multi_type_tree( x1, y0, cbWidth / 2, cbHeight, mttDepth + 1, 1, treeType )
            if( x2 < pic_width_in_luma_samples )
            multi_type_tree( x2, y0, cbWidth / 4, cbHeight, mttDepth + 1, 2, treeType )
            } else { /* SPLIT_TT_HOR */
                y1 = y0 + ( cbHeight / 4 )
                y2 = y0 + ( 3 * cbHeight / 4 )
            multi_type_tree( x0, y0, cbWidth, cbHeight / 4, mttDepth + 1, 0, treeType )
            if( y1 < pic_height_in_luma_samples )
            multi_type_tree( x0, y1, cbWidth, cbHeight / 2, mttDepth + 1, 1, treeType )
            if( y2 < pic_height_in_luma_samples )
            multi_type_tree( x0, y2, cbWidth, cbHeight / 4, mttDepth + 1, 2, treeType)
            }
        } else
            coding_unit( x0, y0, cbWidth, cbHeight, treeType )
}
``` | ae(v) |

7.3.4.5 Coding Unit Syntax

| | Descriptor |
|---|---|
| ```
coding_unit( x0, y0, cbWidth, cbHeight, treeType ) {
    if( slice_type != I ) {
        pred_mode_flag
    }
    if( CuPredMode[ x0 ][ y0 ] = = MODE_INTRA ) {
        [Ed. (BB): Intra prediction yet to be added, pending further
specification development.]
    } else {
        [Ed. (BB): Inter prediction yet to be added, pending further
specification development.]
    }
    if( CuPredMode[ x0 ][ y0 ] != MODE_INTRA
        && x0 + cbWidth < pic_width_in_luma_samples
        && y0 + cbHeight < pic_height_in_luma_samples)
        cu_cbf
    if( cu_cbf ) {
        transform_tree( x0, y0, cbWidth, cbHeight, treeType )
}
``` | ae(v)<br><br><br><br><br><br><br><br><br><br><br>ae(v) |

7.4.5.5 Coding Unit Semantics cu_cbf equal to 1 specifies that the transform_tree( )) syntax structure is present for the current coding unit. cu_cbf equal to 0 specifies that the transform_tree( )) syntax structure is not present for the current coding unit.

When cu_cbf is not present, the following applies:
  If one or more of the following conditions are true, the value of cu_cbf is inferred to be equal to 0:
    x0+cbWidth is greater than pic_width_in_luma_samples.
    y0+cbHeight is greater than pic_height_in_luma_samples.

The processing 800 (shown in FIG. 8A) and 900 (shown in FIG. 9A) are illustrations of another embodiment of a method using the versatile boundary partition processing, which may be performed by the video encoder 200 as shown in FIG. 2 and the video decoder 300 as shown in FIG. 3 respectively.

Figure 8A:
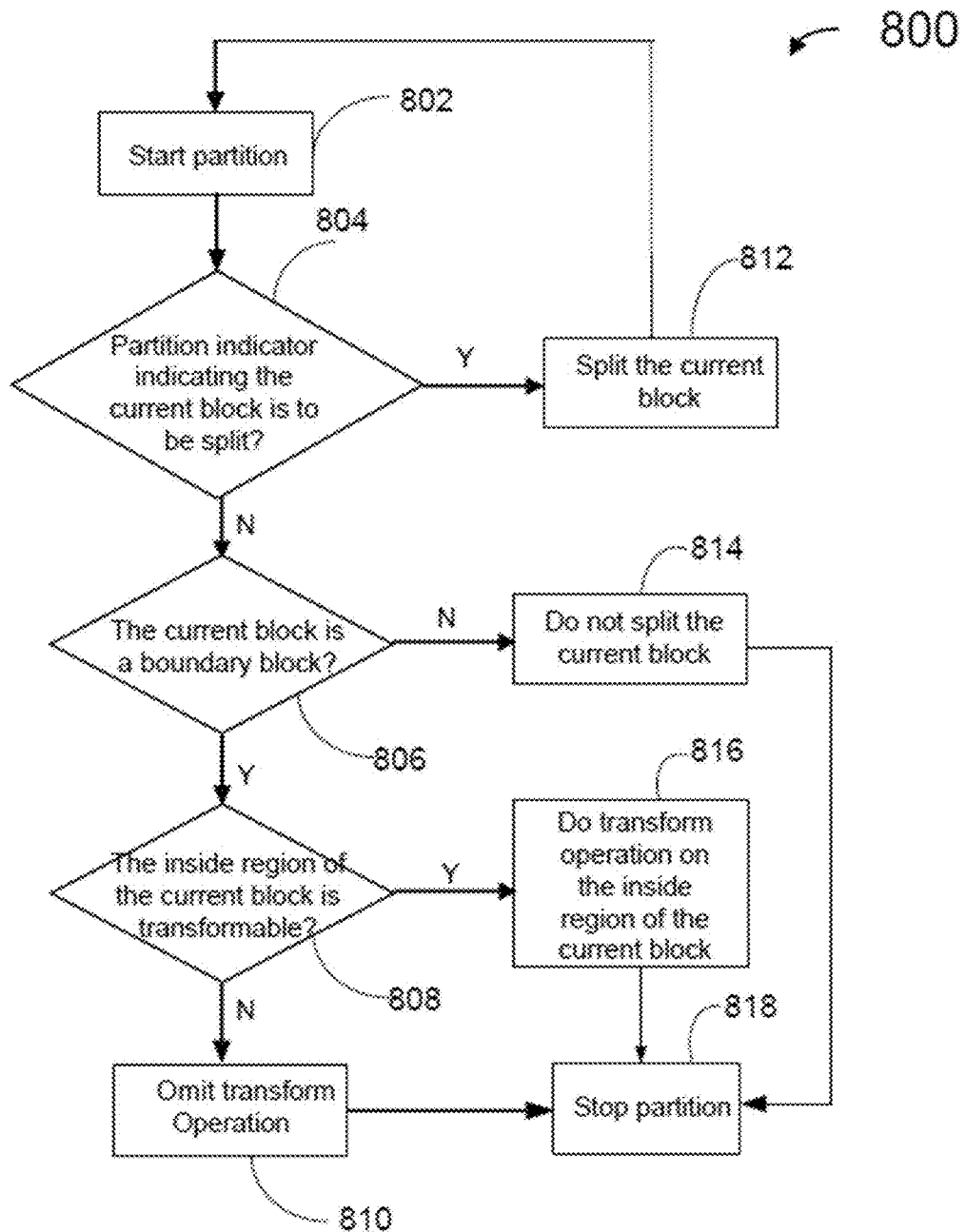
FIG. 8A is a flowchart illustrating an embodiment 800 of a method for encoding a bitstream.

The steps 802, 804, 806, 812 and 814 in FIG. 8A correspond to the steps 602, 604, 606, 608, and 612 in FIG. 6A respectively. The differences between the processing 800

Figure 8B:
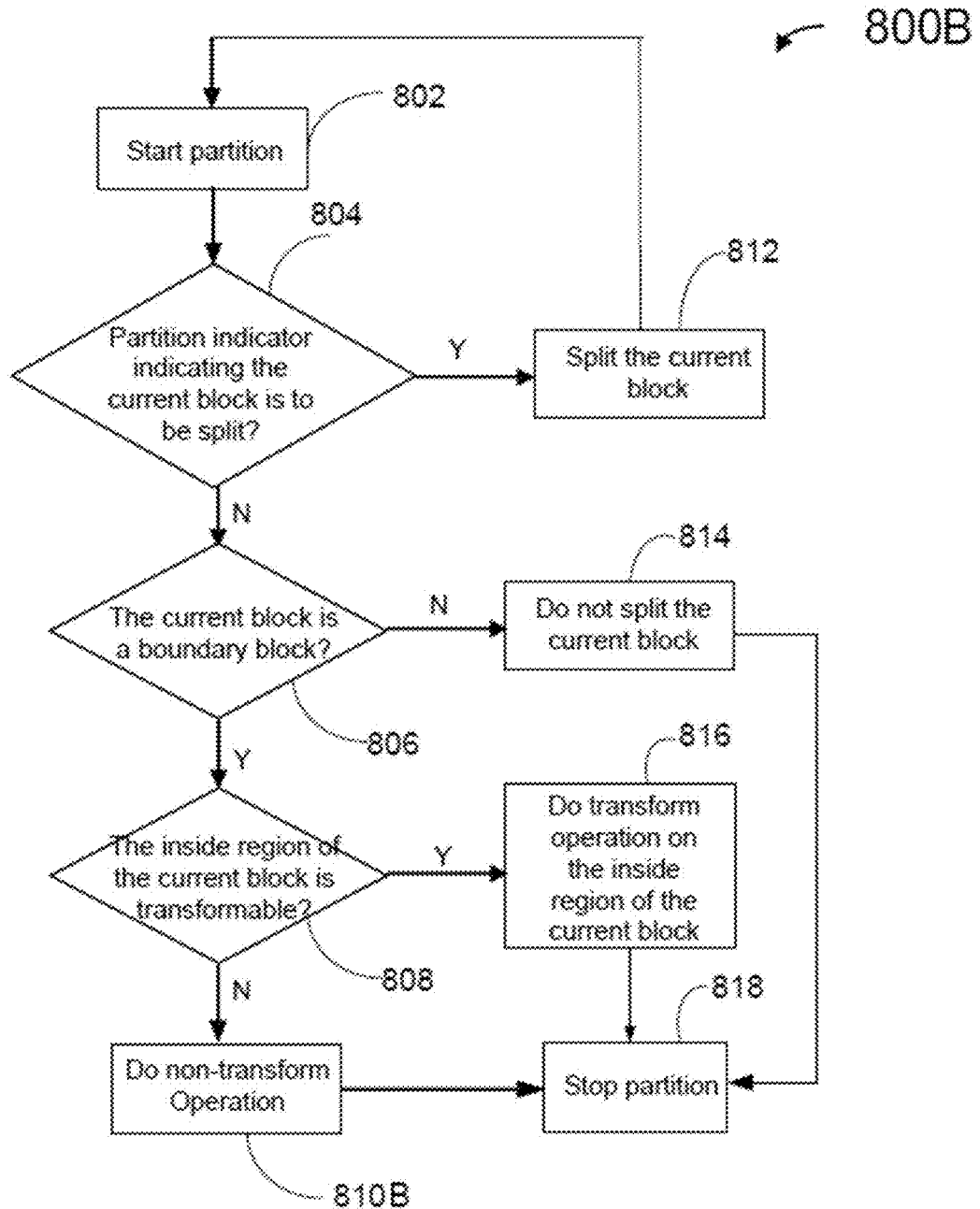
FIG. 8B is a flowchart illustrating an embodiment 800B of a method for encoding a bitstream.

(shown in FIG. 8A) and the processing 600 (shown in FIG. 6A) are when the current block is determined as a boundary block, in step 808, it is determined additionally whether the inside part of the current block is transformable. In step 808, if determined that the inside part of the current block is transformable, the normal transformation operation will be performed on the inside part of the current block in step 816, and if determined that the inside part of the current block is not transformable, the transform operation on the current block will be omitted in step 810. For instance, a non-transform operation will be performed on the inside part in step 810B of the processing 800B shown in FIG. 8B. When it is determined in step 806 that the current block is not a boundary block, in step 814, split is not to be performed on the current block. After step 814 and step 816, the method may stop partition at step 818 after receiving an indicator to indicate no further split. Steps 802 to 808 and steps 812 to 818 of the processing 800B correspond to the steps having the same numbers in processing 800.

Figure 9A:
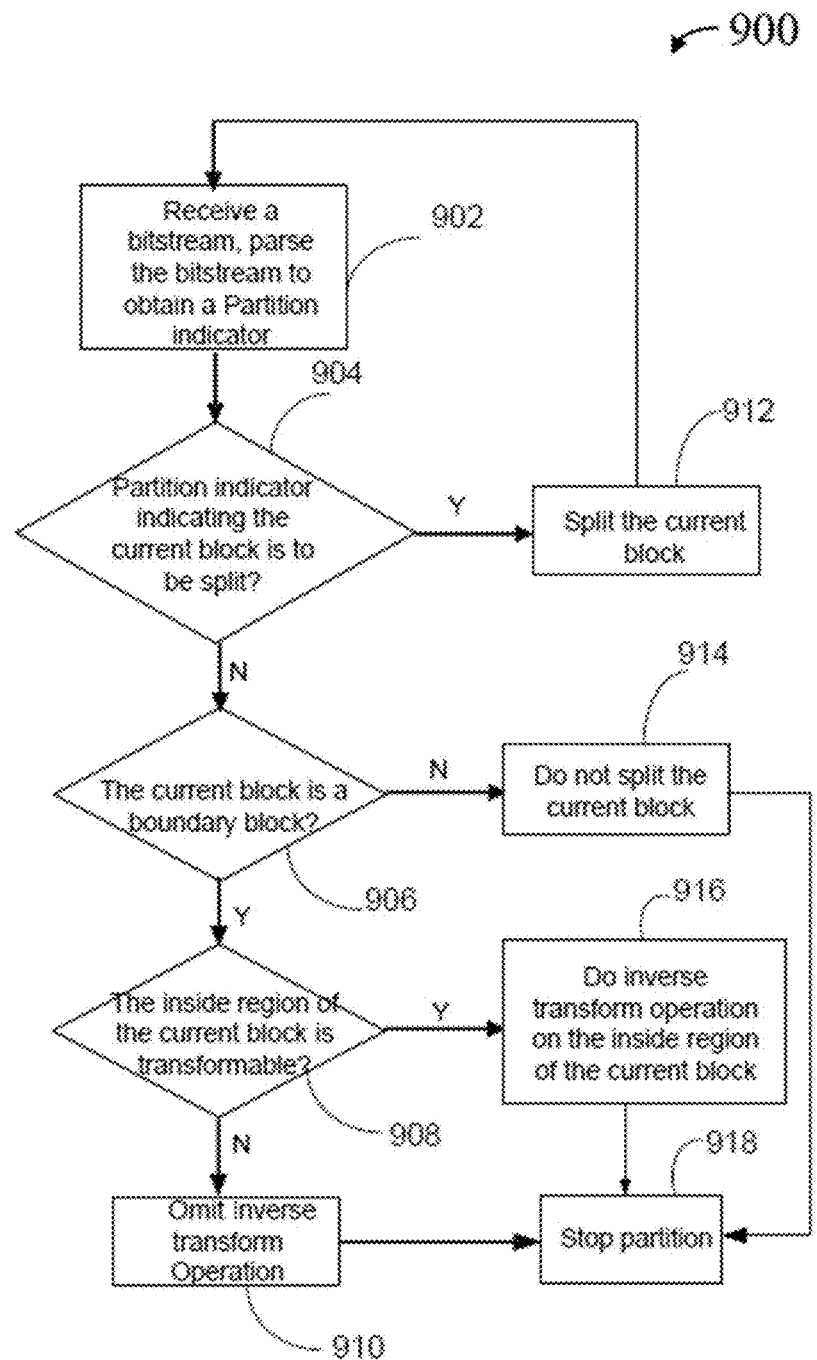
FIG. 9A is a flowchart illustrating an embodiment 900 of a method for decoding a bitstream.
Figure 9B:
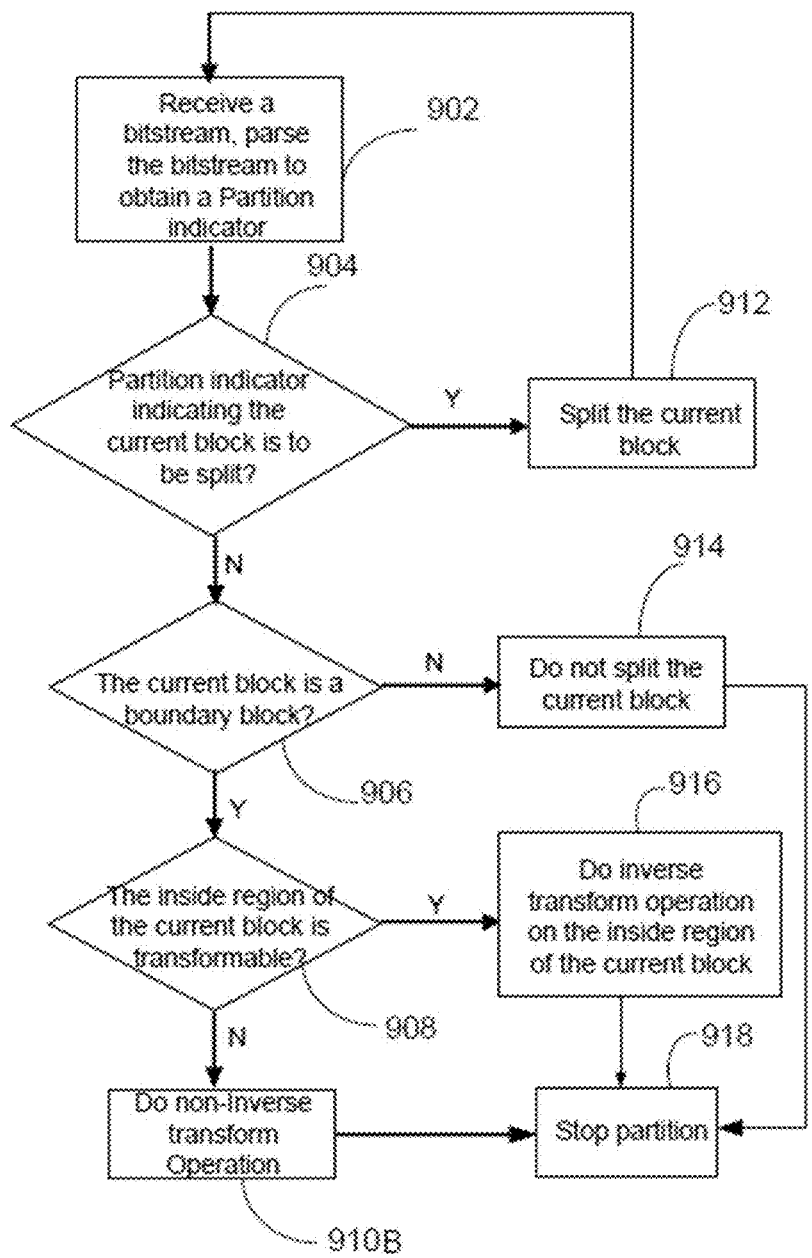
FIG. 9B is a flowchart illustrating an embodiment 900B of a method for decoding a bitstream.

The steps 902, 904, 906, 912 and 914 in FIG. 9A correspond to the steps 702, 704, 706, 708, and 712 in FIG. 7A respectively. The differences between the processing 900 (shown in FIG. 9A) and the processing 700 (shown in FIG. 7A) are when the current block is determined as a boundary block it is determined whether the inside part of the current block is transformable in step 908. In step 908, if determined that the inside part of the current block is transformable, the normal inverse transformation operation will be performed on the inside part of the current block in step 916, and if determined that the inside part of the current block is not transformable, the normal transform operation of the current block will be omitted. For instance, a non-inverse transform operation will be performed on the inside part in step 910B of processing 900B shown in FIG. 9B. When it is determined in step 906 that the current block is not a boundary block, in step 914, split is not to be performed on the current block. After step 914 and step 916, the method may stop partition at step 818 after receiving an indicator to indicate no further split. Steps 902 to 908 and steps 12 to 918 of processing 900B correspond to the steps having the same numbers in processing 900.

To simplify the description, non-transform operation is a general term which corresponds to non-transform operation which is performed at the encoder side, and corresponds to non-inverse transform operation which is performed at the decoder side.

The expression "whether the inside part of the current block is transformable" corresponds to determine whether the inside part of the current block fulfills a transform core constraint. For example, determine whether the width and the height of the inside part of the current block comprises 2 power of n pixels.

As described above, there are three schemes for performing non-inverse transform operation. Just as an example, to set cbf_flag as 0 (corresponds to non-transform coefficients scheme), comparing the version 2 of draft text 2 of VVC [JVET-K1001-v2], the changes of solution 2 is highlighted as follows (the underlined text marks newly-added text, the text with a breakthrough marks text to be deleted):

7.3.4.3 Coding Quadtree Syntax

|  | Descriptor |
|---|---|
| coding_quadtree( x0, y0, log2CbSize, cqtDepth, treeType ) { | |
| if( ( | |
|     log2CbSize > MinQtLog2SizeY ) | |
|       qt_split_cu_flag[ x0 ][ y0 ] | ae(v) |
| } | |
| if( qt_split_cu_flag[ x0 ][ y0 ] ) { | |
|     x1 = x0 + ( 1 << ( log2CbSize − 1 ) ) | |
|     y1 = y0 + ( 1 << ( log2CbSize − 1 ) ) | |
|     coding_quadtree( x0, y0, log2CbSize − 1, cqtDepth + 1, treeType ) | |
|       if( x1 < pic_width_in_luma_samples ) | |
|     coding_quadtree( x1, y0, log2CbSize − 1, cqtDepth + 1, treeType ) | |
|       if( y1 < pic height_in_luma_samples ) | |
|     coding_quadtree( x0, y1, log2CbSize − 1, cqtDepth + 1, treeType ) | |
|       if( x1 < pic_width_in_luma_samples && y1 < pic_height_in_luma_samples ) | |
|     coding_quadtree( x1, y1, log2CbSize − 1, cqtDepth + 1, treeType ) | |
| } else | |
|     multi_type_tree( x0, y0, 1 << log2CbSize, 1 << log2CbSize, 0, 0, treeType ) | |
| } | |

7.3.4.4 Multi-type tree syntax

|  | Descriptor |
|---|---|
| multi_type_tree( x0, y0, cbWidth, cbHeight, mttDepth, partIdx, treeType ) { | |
|   if( allowSplitBtVer || allowSplitBtHor || allowSplitTtVer || allowSplitTtHor ) | |
|     mtt_split_cu_flag | ae(v) |
|   if( mtt_split_cu_flag ) { | |
|     if( ( allowSplitBtHor || allowSplitTtHor ) && | |
|       ( allowSplitBtVer || allowSplitTtVer ) ) | |
|     mtt_split_cu_vertical_flag | ae(v) |
|   if( ( allowSplitBtVer && allowSplitTtVer && mtt_split_cu_vertical_flag ) || | |

|  | Descriptor |
|---|---|
| ( allowSplitBtHor && allowSplitTtHor<br>&& !mtt_split_cu_vertical flag ) )<br>    mtt_split_cu_binary_flag | ae(v) |
|     if( MttSplitMode[ x0 ][ y0 ][ mttDepth ] = = SPLIT_BT_VER ) {<br>      x1 = x0 + ( cbWidth >> 1 )<br>    multi_type_tree( x0, y0, cbWidth / 2, cbHeight, mttDepth + 1, 0, treeType )<br>      if( x1 < pic_width_in_luma_samples )<br>    multi_type_tree( x1, y0, cbWidth / 2, cbHeightY, mttDepth + 1, 1, treeType )<br>    } else if( MttSplitMode[ x0 ][ y0 ][ mttDepth ] = =<br>SPLIT_BT_HOR ) {<br>      y1 = y0 + ( cbHeight >> 2 )<br>    multi_type_tree( x0, y0, cbWidth, cbHeight / 2, mttDepth + 1, 0, treeType )<br>      if( y1 < pic_height_in_luma_samples )<br>    multi_type_tree( x0, y1, cbWidth, cbHeight / 2, mttDepth + 1, 1, treeType )<br>    } else if( MttSplitMode[ x0 ][ y0 ][ mttDepth ] = =<br>SPLIT_TT_VER ) {<br>      x1 = x0 + ( cbWidth / 4 )<br>      x2 = x0 + ( 3 * cbWidth / 4 )<br>    multi_type_tree( x0, y0, cbWidth / 4, cbHeight, mttDepth + 1, 0, treeType )<br>    if( x1 < pic_width_in_luma_samples )<br>    multi_type_tree( x1, y0, cbWidth / 2, cbHeight, mttDepth + 1, 1, treeType )<br>    if( x2 < pic_width_in_luma_samples )<br>    multi_type_tree( x2, y0, cbWidth / 4, cbHeight, mttDepth + 1, 2, treeType )<br>    } else { /* SPLIT_TT_HOR */<br>      y1 = y0 + ( cbHeight / 4 )<br>      y2 = y0 + ( 3 * cbHeight / 4 )<br>    multi_type_tree( x0, y0, cbWidth, cbHeight / 4, mttDepth + 1, 0, treeType )<br>      if( y1 < pic_height_in_luma_samples )<br>    multi_type_tree( x0, y1, cbWidth, cbHeight / 2, mttDepth + 1, 1, treeType )<br>      if( y2 < pic_height_in_luma_samples )<br>    multi_type_tree( x0, y2, cbWidth, cbHeight / 4, mttDepth + 1, 2, treeType)<br>    }<br>} else<br>    coding_unit( x0, y0, cbWidth, cbHeight, treeType )<br>} |  |

7.3.4.5 Coding Unit Syntax

|  | Descriptor |
|---|---|
| coding_unit( x0, y0, cbWidth, cbHeight, treeType ) {<br>    if( slice_type != I ) {<br>        pred_mode_flag | ae(v) |
|     }<br>    if( CuPredMode[ x0 ][ y0 ] = = MODE_INTRA ) {<br>    [Ed. (BB): Intra prediction yet to be added, pending further<br>specification development.]<br>    } else {<br>    [Ed. (BB): Inter prediction yet to be added, pending further<br>specification development.]<br>    }<br>    if( CuPredMode[ x0 ][ y0 ] != MODE_INTRA<br>    && isTransformable(cbWidth ) && isTransformable(cbHeight))<br>        cu_cbf | ae(v) |
|     if( cu_cbf ) {<br>        transform_tree( x0, y0, cbWidth, cbHeight, treeType )<br>} |  |

7.4.5.5 Coding Unit Semantics cu_cbf equal to 1 specifies that the transform_tree( ) syntax structure is present for the current coding unit. cu_cbf equal to 0 specifies that the transform_tree( ) syntax structure is not present for the current coding unit.

When cu_cbf is not present, the following applies:

If one or more of the following conditions are false, the value of cu_cbf is inferred to be equal to 0:
    isTransformable(cbWidth).
    isTransformable(cbHeight)).

Otherwise, the value of cu_cbf is inferred to be equal to 1

If x0+cbWidth is smaller than pic_width_in_luma_samples, isTransformable(cbWidth) is inferred to be 1

Otherwise, if isPowerOfTwo(pic_width_in_luma_samples−x0) true, isTransformable(cbWidth) is infered to be 1

Otherwise, isTransformable(cbWidth) is infered to be 0

If x0+cbHeight is smaller than pic_height_in_luma_samples, isTransformable(cbHeight) is inferred to be 1

Otherwise, if isPowerOfTwo(pic_height_in_luma_samples−x0) true, isTransformable(cbHeight) is infered to be 1

Otherwise, isTransformable(cbHeight) is infered to be 0.

FIG. 10 is an example of a block partition syntax (which may also be referred to as a conventional block partition syntax, or a regular block partition syntax, or a unchanged regular block partition syntax) according to an embodiment, where whether the partition indicator (as shown in FIGS. 6A-7B and 8A-9B) indicates that a current block is to be split or not is determined according to a common block partition syntax, which is common for non-boundary blocks and boundary blocks and which comprises a partition indicator (or partition indicator value) which for non-boundary blocks indicates that the current block is not to be split and which for boundary blocks indicates that the boundary partition is to be performed on the current block. In other words, whether the current block is to be split is determined according to the (predetermined) boundary partition. Put differently, the same partition indicator (or partition indicator value, e.g. 00 shown in FIG. 10) has two different meanings depending on whether the current block is a boundary block or not, e.g. whether the current block is a boundary block or a non-boundary block. Decision tree of FIG. 10 will be checked at each level and each block. As shown in FIG. 10, if noB, the box 1002 in FIG. 10 means "No split"; if isB, the box 1002 in FIG. 10 means "Non-transform operation/Non-inverse transform operation". No matter the current block is isB or noB, the syntax is unchanged. The label 1 on the nodes represents QT split, and the label 0 on the nodes represents non-QT split. Horizontal split in node 1004 includes horizontal TT (HTT) and horizontal BT (HBT). Vertical split in node 1006 includes vertical TT (VTT) and vertical BT (VBT).

The versatile boundary partition can be implemented in several ways, two embodiment are explained based on pseudo codes as shown in Table-2 (decoder for example):

TABLE 2

| Solution 1 | Solution 2 |
|---|---|
| parse_splitting_indicator | parse_splitting_indicator |
| if (no split) then | if (no split) then |
|     if (isBoundary) then |     if (isBoundary) then |
|         Do Non-inverse transform operation |         if (!transformable) then |
|     else |             Do Non-inverse transform operation |
|         Do not split |         else |
|  |             Do normal predict and transform |
|  |     else |
|  |         Do not split |

Referring back to FIGS. 6A-B and 7A-B, further embodiments may comprise performing steps 604 and 606 (respectively 704 and 706) in one step (e.g. at the same time), or comprise in general determining whether the partition indicator indicates that the current block is to be split and whether the current block is a boundary block (consecutively or concurrently), to omit performing a transform (or inverse transform) operation (steps 610 or 710) and/or to perform a non-transform (or non-inverse transform) operation (step 610B or 710B) when (or when having determined that) the partition indicator indicates that the current block is not to be split and the current block is a boundary block. Embodiments may perform step 608 or 708 when the partition indicator indicates that the current block is to be split and step 612 or 712 when the partition indicator indicates that the current block is not to be split and the current block is not a boundary block.

Referring back to FIGS. 8A-B and 9A-B, further embodiments may comprise performing steps 804, 806 and 808 (respectively 904, 906 and 908) in one step (e.g. at the same time), or in general comprise determining (consecutively or concurrently) whether the partition indicator indicates that the current block is to be split, whether the current block is a boundary block and whether the current block (or inside part of the current block) is transformable, to omit performing a transform (or inverse transform) operation (steps 810 or 910) and/or to perform a non-transform (or non-inverse transform) operation (step 810B or 910B) when (or when having determined that) the partition indicator indicates that the current block is not to be split, the current block is a boundary block and that the part of the current block is not transformable, and to perform a transform (or inverse transform) operation (step 816 or 916) when (or when having determined that) the partition indicator indicates that the current block is not to be split, the current block is a boundary block and that the part of the current block is transformable. Embodiments may perform step 808 or 908 when the partition indicator indicates that the current block is to be split, and step 814 or 814 when the partition indicator indicates that the current block is not to be split and the current block is not a boundary block. Further embodiments may (only) merge steps 804 and 806 (respectively 904 and 906) as described above for FIGS. 6A-B and 7A-B, and perform steps 808 or 908 separately as depicted in FIGS. 8A-B and 9A-B.

Figure 11:
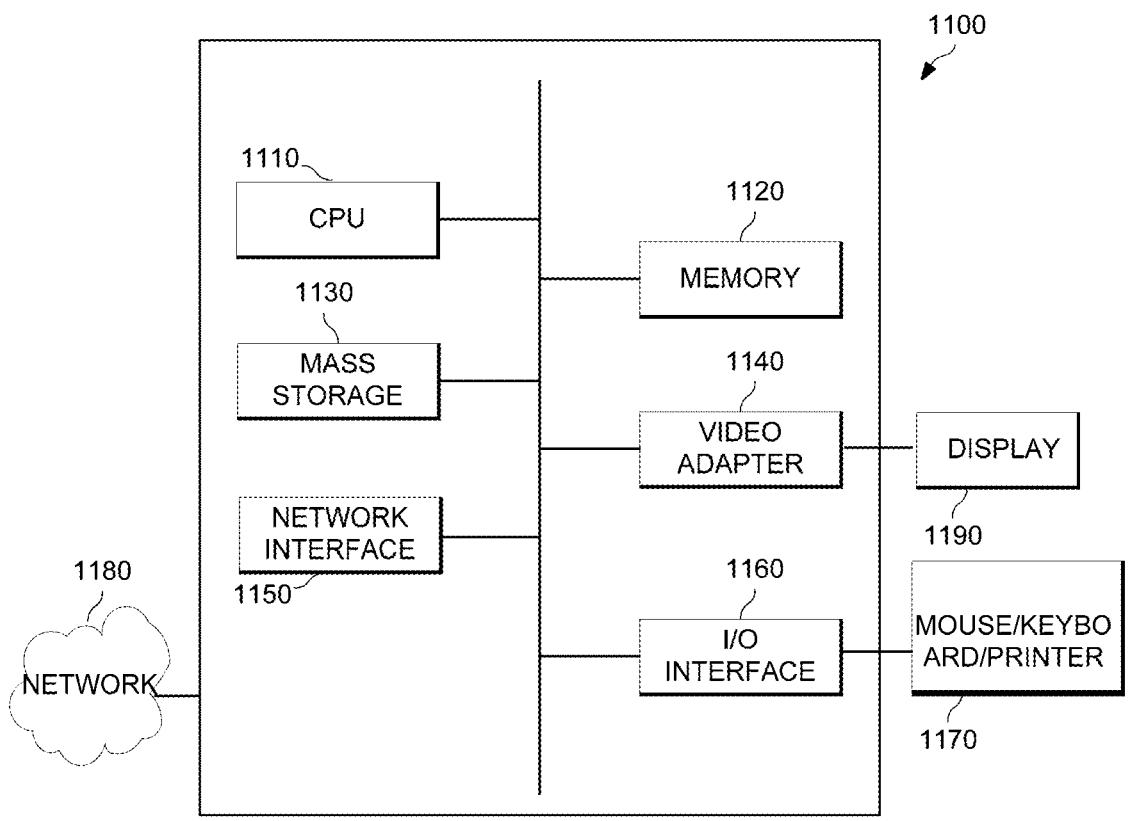
FIG. 11 is a schematic diagram illustrating an exemplary structure of an apparatus.

FIG. 11 is a block diagram of an apparatus 1100 that can be used to implement various embodiments. The apparatus 1100 may be the source device 102 as shown in FIG. 1, or the video encoder 200 as shown in FIG. 2, or the destination device 104 as shown in FIG. 1, or the video decoder 300 as shown in FIG. 3. Additionally, the apparatus 1100 can host one or more of the described elements. In some embodiments, the apparatus 1100 is equipped with one or more input/output devices, such as a speaker, microphone, mouse, touchscreen, keypad, keyboard, printer, display, and the like. The apparatus 1100 may include one or more central processing units (CPUs) 1110, a memory 1120, a mass storage 1130, a video adapter 1140, and an I/O interface 1160 connected to a bus. The bus is one or more of any type of several bus architectures including a memory bus or memory controller, a peripheral bus, a video bus, or the like.

The CPU 1110 may have any type of electronic data processor. The memory 1120 may have, or be, any type of system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs. In embodiments, the memory 1120 is non-transitory. The mass storage 1130 includes any type of storage device that stores data, programs, and other information and to make the data, programs, and other information accessible via the bus. The mass storage 1130 includes, for example, one or more of a solid state drive, hard disk drive, a magnetic disk drive, an optical disk drive, or the like.

The video adapter 1140 and the I/O interface 1160 provide interfaces to couple external input and output devices to the apparatus 1100. For example, the apparatus 1100 may provide SQL command interface to clients. As illustrated, examples of input and output devices include a display 1190 coupled to the video adapter 1140 and any combination of mouse/keyboard/printer 1170 coupled to the I/O interface 1160. Other devices may be coupled to the apparatus 1100, and additional or fewer interface cards may be utilized. For example, a serial interface card (not shown) may be used to provide a serial interface for a printer.

The apparatus 1100 also includes one or more network interfaces 1150, which includes wired links, such as an Ethernet cable or the like, and/or wireless links to access nodes or one or more networks 1180. The network interface 1150 allows the apparatus 1100 to communicate with remote units via the networks 1180. For example, the network interface 1150 may provide communication to database. In an embodiment, the apparatus 1100 is coupled to a local-area network or a wide-area network for data processing and communications with remote devices, such as other processing units, the Internet, remote storage facilities, or the like.

As discussed above, no matter whether the block is a boundary block or a non-boundary block, the non-boundary block partition syntax is used in the versatile boundary partition methods, and apparatus (for example, encoder and decoder). The non-boundary block partition syntax is unchanged so that the continuality of CABAC engine is kept. The partition of boundary located on CTU/CU is more flexible. Moreover, there is no need to extend the maximum allowed binary and ternary tree depth (MaxBTTDepth) for boundary partition. As a result, the coding complexity will be lowered.

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

In some implementations, the operations described in this disclosure may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise require a lengthy period of time before the resources may be delivered to the circuit.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in, special purpose logic circuitry.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Summarizing, a method for boundary partition of a current block of a picture is provided. The method includes that obtaining a partition indicator from a received bitstream; determining whether the partition indicator indicates that the current block is to be split; determining whether the current block is a boundary block when the partition indicator indicates that the current block is not to be split; and performing a non-inverse transform operation on an inside part of the current block when the current block is a boundary block, wherein the inside part of the block is located within the picture. For the boundary block which is determined not to be split, a non-inverse transform operation is chosen, this avoids a normal inverse transform on the residuals of the inside part of the current block (within the picture) in the decoder, so the number of blocks for the inverse transformation is decreased, and decoding complexity is thus reduced.

What is claimed is:

1. A method for boundary partition of a current block of a picture, wherein the method is performed by a decoding apparatus, and the method comprises:

obtaining a partition indicator from a received bitstream;
determining whether the partition indicator indicates that the current block is to be split and whether the current block is a boundary block;
omitting performing of an inverse transform operation on a part of the current block when the partition indicator indicates that the current block is not to be split and the current block is a boundary block, wherein the part of the current block is located within the picture; and
in response to the partition indicator indicating that the current block is to be split, splitting the current block without determining whether the current clock is a boundary block.

2. The method according to claim 1, comprising:
determining whether the current block is a boundary block when the partition indicator indicates that the current block is not to be split.

3. The method according to claim 1, wherein whether the partition indicator indicates that the current block is to be split is determined according to a block partition syntax.

4. The method according to claim 1, wherein, after determining that the current block is a boundary block, the method comprises:
determining whether the part of the current block is transformable; and
omitting performing of the inverse transform operation on the part of the current block within the picture when the part of the current block is not transformable.

5. The method according to claim 4, wherein, after determining that the part of the current block within the picture is transformable, the method further comprises:
determining that the part of the current block within the picture is to be transformed.

6. The method according to claim 4, wherein determining that the current block is transformable comprises:
determining that a size of the part of the current block within the picture fulfills a transform constraint.

7. The method according to claim 1, wherein, when the current block is determined not to be a boundary block and the partition indicator indicates that the current block is not to be split, the method includes determining that the current block is not to be split.

8. The method according to claim 1, wherein the current block is a boundary block when the current block is located only partially within a picture; and the current block is a non-boundary block when the current block is completely located within the picture.

9. The method according to claim 1, wherein, when performing of the inverse transform operation is omitted on the part of the current block, the method includes performing one of the following:
bypassing an inverse transform on residuals of the part of the current block in the decoder;
setting residuals of the part of the current block to zero in the decoder; and
using skip mode prediction on the part of the current block in the decoder.

10. A method for boundary partition of a current block of a picture, wherein the method is performed by an encoding apparatus and the method comprises:
determining a partition indicator, wherein the partition indicator indicates whether the current block is to be split, and whether the current block is a boundary block;
omitting performing of a transform operation on a part of the current block when the partition indicator indicates that the current block is not to be split and the current block is a boundary block, wherein the part of the block is located within the picture;

generating a bitstream including the partition indicator; and in response to the partition indicator indicating that the current block is to be split, splitting the current block without determining whether the current clock is a boundary block.

11. The method according to claim 10, comprising:
determining whether the current block is a boundary block when the partition indicator indicates that the current block is not to be split.

12. The method according to claim 10, wherein the partition indicator indicates that the current block is to be split is determined according to a block partition syntax.

13. The method according to claim 10, wherein, after determining that the current block is a boundary block, the method further comprises:
determining whether the part of the current block is transformable; and
omitting performing of the transform operation on the part of the current block within the picture when the part of the current block is not transformable.

14. The method according to claim 13, wherein, after determining that the part of the current block within the picture is transformable, the method further comprises:
determining that the part of the current block within the picture is to be transformed.

15. The method according to claim 13, wherein determining that the current block is transformable comprises:
determining that a size of the part of the current block within the picture fulfills a transform constraint.

16. A computer program product comprising non-transitory computer readable medium which comprises a program code for performing the method according to claim 1, when the program code is executed on a computing device.

17. A computer program product comprising non-transitory computer readable medium which comprises a program code for performing the method according to claim 10, when the program code is executed on a computing device.

18. A decoding apparatus for boundary partition of a current block of a picture, comprising:
one or more processors; and
a non-transitory computer-readable storage medium coupled to the one or more processors and storing programming code for execution by the one or more processors, wherein the programming code, when executed by the one or more processors, configures the decoding apparatus to carry out the method according to claim 1.

19. An encoding apparatus for boundary partition of a current block of a picture, comprising:
one or more processors; and
a non-transitory computer-readable storage medium coupled to the one or more processors and storing programming code for execution by the one or more processors, wherein the programming code, when executed by the one or more processors, configures the encoding apparatus to carry out the method according to claim 10.

* * * * *